United States Patent
Liu et al.

(10) Patent No.: US 12,292,763 B2
(45) Date of Patent: May 6, 2025

(54) ROTATING MECHANISM AND FOLDABLE DISPLAY TERMINAL

(71) Applicant: Huawei Technologies Co., Ltd., Shenzhen (CN)

(72) Inventors: Yong Liu, Dongguan (CN); Hideo Kato, Yokohama (JP); Yu Liu, Shanghai (CN); Chunjun Ma, Shanghai (CN); Lexiong Peng, Dongguan (CN); Zhong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 398 days.

(21) Appl. No.: 17/631,271

(22) PCT Filed: Jul. 21, 2020

(86) PCT No.: PCT/CN2020/103366
§ 371 (c)(1),
(2) Date: Jan. 28, 2022

(87) PCT Pub. No.: WO2021/017959
PCT Pub. Date: Feb. 4, 2021

(65) Prior Publication Data
US 2022/0261040 A1   Aug. 18, 2022

(30) Foreign Application Priority Data
Jul. 30, 2019 (CN) .......................... 201910696889.4

(51) Int. Cl.
G06F 1/16   (2006.01)

(52) U.S. Cl.
CPC .......... *G06F 1/1652* (2013.01); *G06F 1/1616* (2013.01); *G06F 1/1681* (2013.01)

(58) Field of Classification Search
CPC ..... G06F 1/1652; G06F 1/1616; G06F 1/1681
See application file for complete search history.

(56) References Cited

U.S. PATENT DOCUMENTS

| 10,070,546 B1 | 9/2018 | Hsu |
| 10,545,541 B1 * | 1/2020 | Dighde ..................... E05D 3/18 |

(Continued)

FOREIGN PATENT DOCUMENTS

| CN | 103576775 A | 2/2014 |
| CN | 106205385 A | 12/2016 |

(Continued)

*Primary Examiner* — Jason W San
*Assistant Examiner* — Matthew J Sullivan
(74) *Attorney, Agent, or Firm* — Slater Matsil, LLP

(57) ABSTRACT

A rotating mechanism includes: a rotating shaft; a first mechanical part, where the first mechanical part is provided with a first slide groove; a second mechanical part, where the second mechanical part is provided with a second slide groove; a third mechanical part, where the third mechanical part is disposed in the first slide groove, and one end of the third mechanical part is rotatably connected to the rotating shaft; and a fourth mechanical part, where the fourth mechanical part is disposed in the second slide groove, and one end of the fourth mechanical part is rotatably connected to the rotating shaft. When the first mechanical part and the second mechanical part rotate around the rotating shaft, the third mechanical part slides with respect to the first slide groove.

20 Claims, 21 Drawing Sheets

(56) References Cited

U.S. PATENT DOCUMENTS

| | | | |
|---|---|---|---|
| 11,016,541 B2* | 5/2021 | Lin | F16C 11/04 |
| 11,720,152 B2* | 8/2023 | Hsu | G06F 1/1681 |
| | | | 16/354 |
| 11,720,153 B2* | 8/2023 | Hsu | G06F 1/1681 |
| | | | 16/250 |
| 11,914,433 B2* | 2/2024 | Liao | G06F 1/1652 |
| 2018/0292860 A1 | 10/2018 | Siddiqui | |
| 2019/0132975 A1 | 5/2019 | Kim et al. | |
| 2019/0390703 A1 | 12/2019 | Hsu | |
| 2023/0384839 A1* | 11/2023 | Cheng | G06F 1/1652 |
| 2023/0403347 A1* | 12/2023 | Liu | H04M 1/022 |
| 2024/0069604 A1* | 2/2024 | Xu | G06F 1/1681 |
| 2024/0074075 A1* | 2/2024 | Kim | G06F 1/1652 |
| 2024/0090147 A1* | 3/2024 | Feng | H10K 59/87 |
| 2024/0094785 A1* | 3/2024 | Cheng | H04M 1/022 |
| 2024/0147645 A1* | 5/2024 | Zhang | H05K 5/0226 |

FOREIGN PATENT DOCUMENTS

| | | |
|---|---|---|
| CN | 107831830 A | 3/2018 |
| CN | 105812509 B | 6/2018 |
| CN | 110442196 A | 11/2019 |
| CN | 211123830 U | 7/2020 |
| EP | 1707829 A1 | 10/2006 |
| EP | 3355157 A1 | 8/2018 |
| KR | 20180094172 A | 8/2018 |
| TW | 201921045 A | 6/2019 |

* cited by examiner

ROTATING MECHANISM AND FOLDABLE DISPLAY TERMINAL

CROSS-REFERENCE TO RELATED APPLICATIONS

This application is a National Stage of International Application No. PCT/CN2020/103366, filed on Jul. 21, 2020, which claims priority to Chinese Patent Application No. 201910696889.4, filed on Jul. 30, 2019. Both of the aforementioned applications are hereby incorporated by reference in their entireties.

TECHNICAL FIELD

Embodiments of this application relate to the field of display technologies, and in particular, to a rotating mechanism and an intelligent terminal.

BACKGROUND

With the continuous development of display technologies, foldable display terminals are gradually becoming a development trend of mobile electronic products in the future. In an unfolded state, a foldable display terminal can have a relatively large display area, thereby improving a viewing effect. In a folded state, the foldable display terminal can have a relatively small volume, which is convenient for a user to carry.

The foldable display terminal includes at least a flexible screen and a rotating mechanism for carrying the flexible screen.

However, in a process of use, the rotating mechanism is prone to generate pulling force on the flexible screen during folding or unfolding, causing damage to the flexible screen and affecting user experience.

SUMMARY

Embodiments of this application provide a rotating mechanism and a foldable display terminal, to resolve a problem that a flexible screen is easily subjected to pulling force and user experience is affected.

To achieve the foregoing objective, the embodiments of this application use the following technical solutions: A first aspect of the embodiments of this application provides a rotating mechanism. The rotating mechanism includes a rotating shaft; a first mechanical part, where the first mechanical part is provided with a first slide groove; a second mechanical part, where the second mechanical part is provided with a second slide groove; a third mechanical part, where a first end of the third mechanical part is connected to the rotating shaft, and a second end of the third mechanical part is disposed in the first slide groove; and a fourth mechanical part, where a first end of the fourth mechanical part is connected to the rotating shaft, and a second end of the fourth mechanical part is disposed in the second slide groove. When the first mechanical part and the second mechanical part rotate around the rotating shaft, the second end of the third mechanical part slides with respect to the first slide groove, and the second end of the fourth mechanical part slides with respect to the second slide groove. In this way, the first mechanical part can slide with respect to the third mechanical part, and the second mechanical part can slide with respect to the fourth mechanical part, so that a part of bending force can be released, pulling force on a flexible screen during rotation of the first mechanical part and the second mechanical part is reduced, and flatness of the flexible screen is improved.

In an optional implementation, the rotating shaft includes a first rotating shaft and a second rotating shaft. The first rotating shaft is connected to the second rotating shaft, and the first rotating shaft and the second rotating shaft are connected through a transmission structure. The third mechanical part is connected to a first end of the transmission structure, and the fourth mechanical part is connected to a second end of the transmission structure. When the third mechanical part drives the first end of the transmission structure to rotate around the first rotating shaft, the second end of the transmission structure drives the fourth mechanical part to rotate around the second rotating shaft. Alternatively, when the fourth mechanical part drives the second end of the transmission structure to rotate around the second rotating shaft, the first end of the transmission structure drives the third mechanical part to rotate around the first rotating shaft. In this way, synchronization between the third mechanical part and the fourth mechanical part is achieved, and synchronization between the first mechanical part and the second mechanical part is further achieved.

In an optional implementation, the transmission structure includes a first gear sleeved on the first rotating shaft and a second gear sleeved on the second rotating shaft, and the first gear meshes with the second gear. In this way, the rotating member is directly connected to the gear, and a length of an arm of force is approximately a radius of a rotating shaft plus a length of the rotating member. The arm of force is longer, and a torque is larger. This can better transmit the torque for unfolding and folding of the rotating mechanism.

In an optional implementation, the rotating mechanism further includes an elastic component. When the first mechanical part and the second mechanical part are in a folded state or an unfolded state, deformation of the elastic component is first deformation. When the first mechanical part and the second mechanical part are in a state between folded and unfolded states, deformation of the elastic component is second deformation. A deformation value of the second deformation is greater than a deformation value of the first deformation.

In this way, when the elastic component changes from the second deformation to the first deformation, a torque can be provided for rotation of the first rotating shaft and the second rotating shaft.

In an optional implementation, the rotating shaft includes a first rotating shaft and a second rotating shaft, and the first rotating shaft is connected to the second rotating shaft. The elastic component includes at least a first elastic component disposed on the third mechanical part. The first rotating shaft is sleeved with a first cam. The third mechanical part is in contact with a surface of the first cam. When the first mechanical part rotates, the first cam is stationary with respect to the first rotating shaft, and the third mechanical part rotates along the surface of the first cam and around the first rotating shaft. The first cam has a first surface, a second surface, and a third surface. When the third mechanical part is in contact with the first surface or the second surface, deformation of the first elastic component is the first deformation. When the third mechanical part is in contact with the third surface, deformation of the first elastic component is the second deformation. In this way, through fitting between a spring and a cam, a torque can be provided for rotation of the first rotating shaft and the second rotating shaft. The first rotating shaft can transmit the torque to the first mechanical part through the third mechanical part, and the second rotating shaft can transmit the torque to the second mechanical part through the fourth mechanical part, so as to finally act on the flexible screen. Therefore, when the rotating mechanism is closing, closing force can be provided to make a folding process easier. In an initial phase from the folded state to a flattened state of the rotating mechanism, proper resistance is provided to avoid too fast unfolding of the flexible screen. When the rotating mechanism is unfolded to a specific angle, proper assistance is provided to achieve automatic flattening, and after the rotating mechanism is unfolded, flattening holding force is provided.

In an optional implementation, the first elastic component and the second elastic component are springs or spring washers.

In an optional implementation, the rotating shaft includes a first rotating shaft and a second rotating shaft, and the first rotating shaft is connected to the second rotating shaft. The elastic component includes at least a first C-shaped clasp sleeved on the first rotating shaft. When the first mechanical part rotates, the first rotating shaft rotates with respect to the first C-shaped clasp. An inner side of the first C-shaped clasp has a first flat surface and a first curved surface. The first rotating shaft includes a third flat surface and a fifth flat surface matching the first flat surface, and a second curved surface matching the first curved surface. When the third flat surface or the fifth flat surface is in contact with the first flat surface, deformation of the first C-shaped clasp is the first deformation. When the second curved surface is in contact with the first flat surface, deformation of the first C-shaped clasp is the second deformation. In this way, a torque can be provided for rotation of the first rotating shaft and the second rotating shaft by disposing the C-shaped clasp, and the first rotating shaft and the second rotating shaft can transfer the torque to the first mechanical part and second mechanical part through the third mechanical part and the fourth mechanical part, so as to finally act on the flexible screen, and provide holding force for folding or flattening of the flexible screen.

In an optional implementation, the rotating shaft includes a third rotating shaft. The elastic component includes at least a second elastic component sleeved on the third rotating shaft. The third rotating shaft is further sleeved with a cam and a concave wheel. The cam is provided with a convex portion, and the concave wheel is provided with a flat portion and at least one concave portion matching the convex portion. When the first mechanical part rotates, the third mechanical part and the concave wheel rotate with respect to the first rotating shaft, and the cam slides with respect to the first rotating shaft. When the convex portion of the cam matches the at least one concave portion, deformation of the second elastic component is the first deformation. When the convex portion of the cam is in contact with the flat portion, deformation of the second elastic component is the second deformation. In this way, a torque is provided for rotation of the third mechanical part and the fourth mechanical part by using the third elastic component, so that a fitting position of the cam and the concave wheel can be used as a flattened position or a folded position of the flexible screen, and holding force can be provided for folding or flattening of the flexible screen.

In an optional implementation, the third elastic component is a belleville washer or a spring washer.

In an optional implementation, the rotating mechanism further includes an elastic component, and the rotating shaft includes a first rotating shaft and a second rotating shaft. The first rotating shaft and the second rotating shaft are connected through a transmission structure. The third mechanical part is connected to a first end of the transmission structure. The fourth mechanical part is connected to a second end of the transmission structure. When the third mechanical part drives the first end of the transmission structure to rotate around the first rotating shaft, the second end of the transmission structure drives the fourth mechanical part to rotate around the second rotating shaft. Alternatively, when the fourth mechanical part drives the second end of the transmission structure to rotate around the second rotating shaft, the first end of the transmission structure drives the third mechanical part to rotate around the first rotating shaft. When the third mechanical part and the fourth mechanical part are in a folded state or an unfolded state, deformation of the elastic component is first deformation. When the third mechanical part and the fourth mechanical part are in a state between folded and unfolded states, deformation of the elastic component is second deformation. A deformation value of the second deformation is greater than a deformation value of the first deformation.

In this way, at the same time when synchronous motion of the third mechanical part and the fourth mechanical part is achieved, a torque is provided for rotation of the third mechanical part and the fourth mechanical part.

In an optional implementation, the rotating mechanism further includes a fifth mechanical part. The fifth mechanical part is disposed in the first slide groove. The transmission structure includes a first gear sleeved on the first rotating shaft and a second gear sleeved on the second rotating shaft. The first gear meshes with the second gear. The elastic component includes a first elastic component sleeved on the fifth mechanical part. The first rotating shaft is sleeved with a first cam. The fifth mechanical part is in contact with a surface of the first cam. When the first mechanical part rotates, the first cam is stationary with respect to the first rotating shaft, and the fifth mechanical part rotates along the surface of the first cam and around the first rotating shaft.

In this way, a plurality of rotating members share one rotating shaft, and coupled mechanical parts occupy very small space, which facilitates miniaturization of the rotating mechanism.

In an optional implementation, the rotating shaft further includes an inner guide shaft and an outer guide shaft, and the inner guide shaft is covered by the outer guide shaft. A length of the inner guide shaft is less than a length of the outer guide shaft. A first end in a length direction of the outer guide shaft extends in the length direction with respect to a first end in a length direction of the inner guide shaft. The first rotating shaft and the second rotating shaft are disposed between the first end in the length direction of the inner guide shaft and the first end in the length direction of the outer guide shaft. In this way, the first rotating shaft and the second rotating shaft are disposed in the outer guide shaft, to protect the first rotating shaft and the second rotating shaft.

In an optional implementation, an outer surface of the inner guide shaft and an inner surface of the outer guide shaft enclose a slide rail. The first mechanical part is provided with a first rotating member on one side close to the rotating shaft, and the second mechanical part is provided with a second rotating member on one side close to the rotating shaft. Both the first rotating member and the second rotating member are located in the slide rail. When the first mechanical part rotates, the first rotating member and the second rotating member rotate around the inner guide shaft.

In this way, coaxial rotation of the first mechanical part and the second mechanical part is achieved.

In an optional implementation, the third mechanical part is sleeved with a first support portion, the second support portion is provided with a first guide rod, and a first guide rail matching the first guide rod is disposed in the first slide groove. The fourth mechanical part is sleeved with a second support portion, the second support portion is provided with a second guide rod, and a second guide rail matching the second guide rod is disposed in the second slide groove. When the first mechanical part or the second mechanical part or both rotate around the rotating shaft, the first guide rod slides along the first guide rail, and the second guide rod slides along the second guide rail.

In this way, slidable connection between the third mechanical part and the first mechanical part is achieved, and in addition, slidable connection between the fourth mechanical part and the second mechanical part is achieved, thereby reducing pulling force on the flexible screen during rotation of the first mechanical part and the second mechanical part, and improving flatness of the flexible screen.

In an optional implementation, the first mechanical part includes a first blade and a third blade. The first blade is provided with a first groove, and the third blade is provided with a first slider matching the first groove. The second mechanical part includes a second blade and a fourth blade. The second blade is provided with a second groove, and the fourth blade is provided with a second slider matching the second groove. When the first mechanical part and the second mechanical part rotate around the rotating shaft, the first slider slides in the first groove, and the second slider slides in the second groove.

In this way, slidable connection between the first blade and the third blade is achieved, and in addition, slidable connection between the second blade and the fourth blade is achieved, further reducing pulling force on the flexible screen during rotation of the first mechanical part and the second mechanical part, and improving flatness of the flexible screen.

According to a second aspect of the embodiments of this application, a foldable display terminal is provided, including: a flexible screen and the foregoing rotating mechanism. A first region of the flexible screen is connected to the first mechanical part. A second region of the flexible display screen is connected to the second mechanical part. A third region of the flexible display screen is connected to the rotating shaft. The third region is located between the first region and the second region.

In this way, the foldable display terminal using the foregoing rotating mechanism is subjected to smaller pulling force, thereby improving flatness of the flexible screen.

BRIEF DESCRIPTION OF THE DRAWINGS

FIG. 1 is a diagram of an unfolded state of the folded display terminal in FIG. 1;

FIG. 21 is a sectional view C-C of the rotating mechanism of FIG. 20a;

DETAILED DESCRIPTION OF ILLUSTRATIVE EMBODIMENTS

The following describes the technical solutions in the embodiments of this application with reference to the accompanying drawings in the embodiments of this application. Apparently, the described embodiments are merely some rather than all of the embodiments of this application.

The following terms "first", "second", and the like are used merely for descriptive purposes, and cannot be understood as indicating or implying relative importance or implicitly indicating the quantity of indicated technical features. Therefore, a feature limited by "first", "second", or the like may explicitly or implicitly include one or more features. In the description of the present invention, unless otherwise stated, the meaning of "a plurality of" means two or more than two.

In addition, in this application, orientation terms such as "up" and "down" are defined with respect to the orientation of the components schematically placed in the accompanying drawings. It should be understood that these orientation terms are relative concepts, and are used for relative description and clarification. They may vary accordingly depending on the orientation in which the components are placed in the accompanying drawings.

An embodiment of this application provides a foldable display terminal. The foldable display terminal may be a product that has a display interface, such as a mobile phone, a display, a tablet computer, or an in-vehicle computer. A specific form of the foldable display terminal is not specifically limited in this embodiment of this application.

Figure 1:
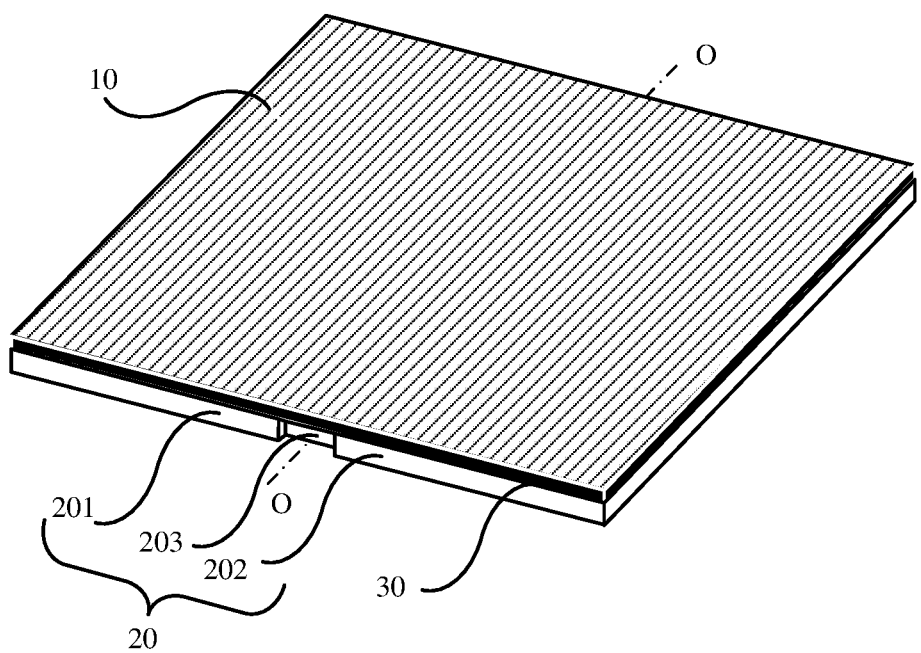
FIG. 1 is a schematic diagram of a structure of a foldable display terminal in the prior art.

To help understand the foldable display terminal provided in this embodiment of this application, the following describes an existing foldable display terminal with reference to FIG. 1.

As shown in FIG. 1, a foldable display terminal 01 includes a flexible screen 10. The flexible screen 10 may be an active matrix organic light emitting diode (active matrix organic light emitting diode, AMOLED) display.

The AMOLED display is a self-luminous display, and does not need to be provided with a back light module (back light module, BLM). Therefore, when a substrate of the AMOLED display is made of a flexible resin material, such as polyethylene terephthalate (polyethylene terephthalate, PET), the AMOLED display can have a bendable characteristic.

In addition, as shown in FIG. 1, the foldable display terminal 01 further includes a rotating mechanism 20 for carrying the flexible screen 10.

The rotating mechanism 20 includes a first mechanical part 201, a second mechanical part 202, and a rotating shaft 203 located between the first mechanical part 201 and the second mechanical part 202.

The rotating shaft 203 is connected to the first mechanical part 201 and the second mechanical part 202. The first mechanical part 201 and the second mechanical part 202 each may rotate around the rotating shaft 203. The first mechanical part 201 and the second mechanical part 202 may be a housing, or may be a middle frame structure of an electronic device.

The first mechanical part 201 and the second mechanical part 202 may be configured to carry the flexible screen 10, to keep the flexible screen 10 as flat as possible during use, and to protect a non-display surface of the flexible screen 10.

A part of the flexible screen 10 is fixed to the first mechanical part 201 by using an adhesive layer 30, a part of the flexible screen 10 is fixed to the second mechanical part 202 by using the adhesive layer 30, and a part of the flexible screen 10 is fixed to the rotating shaft 203 by using the adhesive layer 30. The adhesive layer 30 may be a thin film layer formed after applying an adhesive, and a specific form of the adhesive layer 30 is not limited in the embodiment of this application. In addition, another electronic component such as a camera, a headset, a receiver, a button, or a battery may be disposed on the first mechanical part 201 and the second mechanical part 202. The another electronic component disposed on the first mechanical part 201 and the second mechanical part 202 is not limited in this embodiment of this application.

Figure 1A:
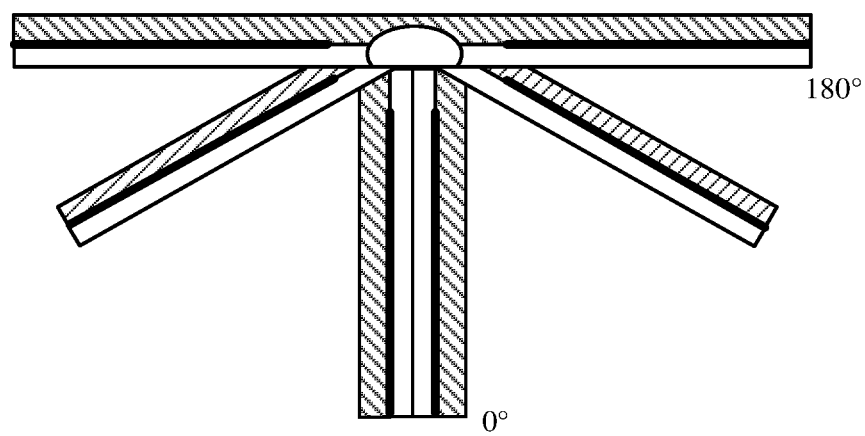
FIG. 1a is a diagram of a use state of the foldable display terminal in FIG. 1.

The first mechanical part 201 and the second mechanical part 202 each may rotate around an axis O-O of the rotating shaft 203, to drive the flexible screen 10 to fold or unfold. As shown in FIG. 1a, the flexible screen can be bent and flattened. FIG. 1a shows a flattening process of the flexible screen from 180° to 0°, or a folding process of the flexible screen from 0° to 180°.

Figure 1B:
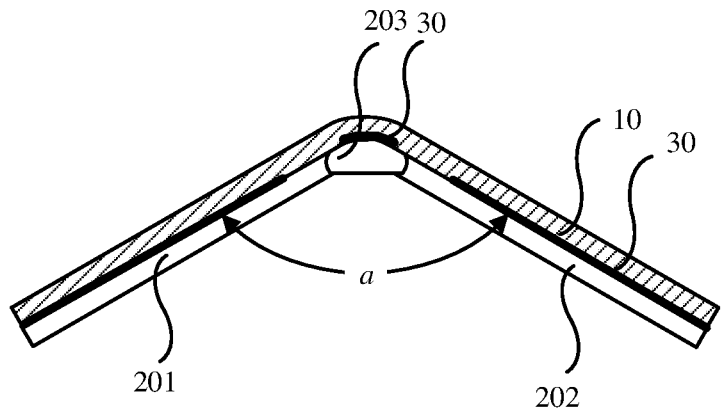
FIG. 1b is a diagram of a bent state of a foldable display terminal in FIG. 1.

As shown in FIG. 1b, when an included angle α between the first mechanical part 201 and the second mechanical part 202 is 00, the flexible screen 10 is in a folded state.

Figure 1C:
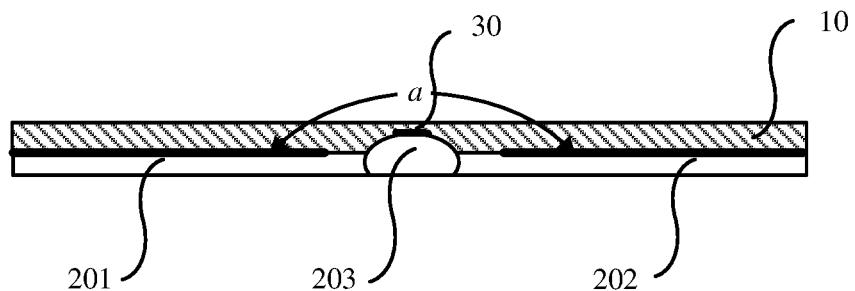

Alternatively, as shown in FIG. 1c, when an included angle α between the first mechanical part 201 and the second mechanical part 202 increases to 180°, the flexible screen 10 is in an unfolded state.

However, when the first mechanical part 201 and the second mechanical part 202 do not have a bendable characteristic, areas of the flexible screen 10 that are connected to the first mechanical part 201, the second mechanical part 202, and the rotating shaft 203 through the adhesive layer 30 are subjected to pulling force during folding and unfolding, affecting flatness of the flexible screen.

Therefore, an embodiment of this application provides an improved rotating mechanism.

Figure 2:
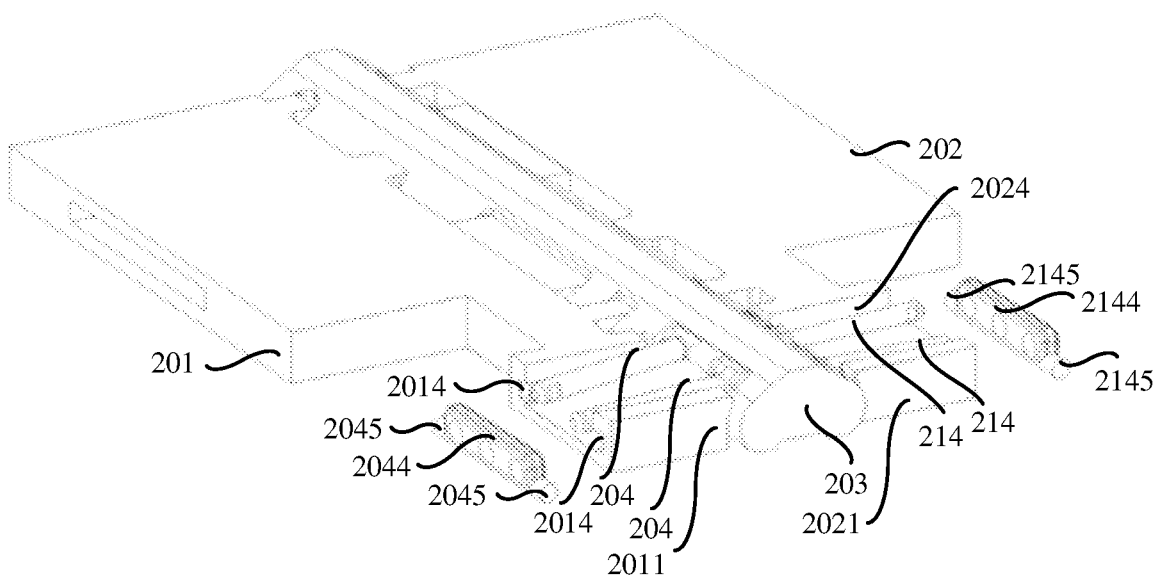
FIG. 2 is a schematic diagram of a three-dimensional structure of a rotating mechanism according to an embodiment of this application.
Figure 2A:
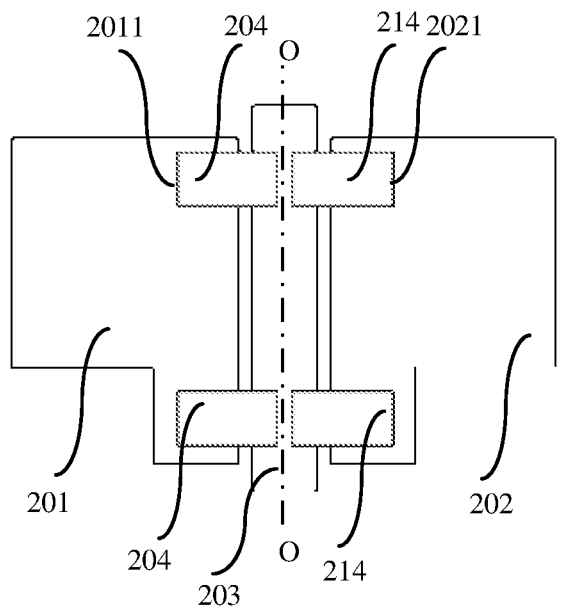
FIG. 2a is a schematic diagram of a structure of the rotating mechanism in FIG. 2.

To reduce pulling force on the flexible screen during rotation of the first mechanical part and the second mechanical part, as shown in FIG. 2 and FIG. 2a, the rotating mechanism further includes a third mechanical part 204 and a fourth mechanical part 214. The first mechanical part 201 is provided with a first slide groove 2011, and the second mechanical part 202 is provided with a second slide groove 2021.

The third mechanical part 204 and the fourth mechanical part 214 may be rotating members of columnar structures. Cross sections of the third mechanical part 204 and the fourth mechanical part 214 are, for example, circular or polygonal. Shapes of the cross sections of the third mechanical part and the fourth mechanical part are not limited in this embodiment of this application. A first end of the third mechanical part 204 is rotatably connected to the rotating shaft 203, and a second end of the third mechanical part 204, as shown in FIG. 2, may extend into the first slide groove 2011, and be slidably connected to the first slide groove 2011. In this way, when the first mechanical part 201 rotates around the axis O-O of the rotating shaft 203, the first mechanical part 201 can slide with respect to the third mechanical part 204 by a preset distance in a direction close to or away from the rotating shaft 203.

Similarly, a first end of the fourth mechanical part 214 is rotatably connected to the rotating shaft 203, and a second end of the fourth mechanical part 214 may extend into the second slide groove 2021, and be slidably connected to the second slide groove 2021. In this way, when the second mechanical part 202 rotates around the axis O-O of the rotating shaft 203, the second mechanical part 202 can slide with respect to the fourth mechanical part 214 in a direction close to or away from the rotating shaft 203.

In this embodiment of this application, a connection manner between the third mechanical part 204 and the first slide groove 2011 and a connection manner between the fourth mechanical part 214 and the second slide groove 2021 are not limited, as long as slidable connection is achieved.

In an implementation of this application, as shown in FIG. 2, a first support portion 2044 is disposed at an end position of the second end of the third mechanical part 204. The first support portion 2044 is further provided with a first guide rod 2045, and an axis of the first guide rod 2045 is perpendicular to an axial direction of the third mechanical part 204. A first guide rail 2014 matching the first guide rod 2045 is disposed on either side of the first slide groove 2011. When the first mechanical part 201 rotates, the first guide rod 2045 may slide along the first guide rail 2014.

Similarly, a second support portion 2144 is disposed at an end position of the second end of the fourth mechanical part 214. The second support portion 2144 is provided with a second guide rod 2145, and an axis of the second guide rod 2145 is perpendicular to an axial direction of the fourth mechanical part 214. A second guide rail 2024 matching the second guide rod 2145 is disposed on either side of the second slide groove 2021. When the second mechanical part 202 rotates, the second guide rod 2145 may slide along the second guide rail 2024.

Figure 2B:
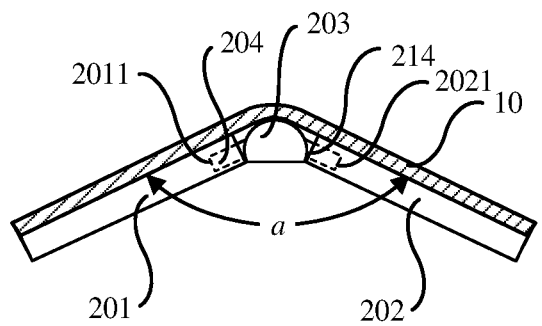
FIG. 2b is a schematic diagram of a structure of a folded display terminal in a bent state.

For example, as shown in FIG. 2b, when the first mechanical part 201 or the second mechanical part 202 or both rotate around the rotating shaft 203 so that the included angle α between the first mechanical part 201 and the second mechanical part 202 is less than 180°, the flexible screen 10 is folded.

In a folding process of the flexible screen 10, the first mechanical part 201 slides with respect to the third mechanical part 204 in the direction close to the rotating shaft 203, and the second mechanical part 202 slides with respect to the fourth mechanical part 214 in the direction close to the rotating shaft 203. In this way, the first mechanical part 201 can slide with respect to the third mechanical part 204, and the second mechanical part 214 can slide with respect to the fourth mechanical part 214. This can release a part of bending force, thereby reducing pulling force on the flexible screen, and avoiding excessive pulling force on the flexible screen in a bending process.

Figure 2C:
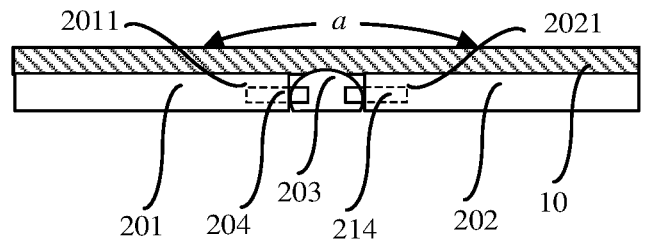
FIG. 2c is a schematic diagram of a structure of a foldable display terminal in an unfolded state.

Alternatively, as shown in FIG. 2c, when the first mechanical part 201 or the second mechanical part 202 or both rotate around the rotating shaft 203 so that the included angle α between the first mechanical part 201 and the second mechanical part 202 increases to 180°, the flexible screen 10 is in the unfolded state.

In an unfolding process of the flexible screen 10, the first mechanical part 201 slides with respect to the third mechanical part 204 in the direction away from the rotating shaft 203, and the second mechanical part 202 slides with respect to the fourth mechanical part 214 in the direction away from the rotating shaft 203. In this way, the first mechanical part 201 can slide with respect to the third mechanical part 204, and the second mechanical part 214 can slide with respect to the fourth mechanical part 214. This can release a part of stretching force, thereby reducing pulling force on the flexible screen, and avoiding excessive pulling force on the flexible screen in a stretching process.

According to the rotating mechanism provided in this embodiment of this application, the third mechanical part is slidably connected to the first mechanical part, and the fourth mechanical part is slidably connected to the second mechanical part, thereby reducing pulling force of the first mechanical part, the second mechanical part, and the rotating shaft on the flexible screen, and improving flatness of the flexible screen.

Figure 3:
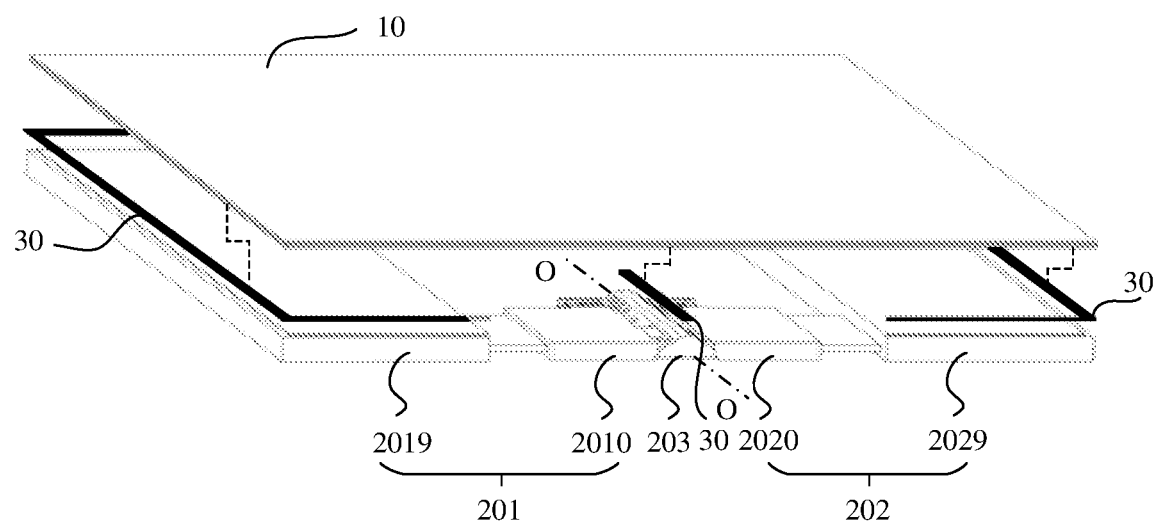
FIG. 3 is a schematic diagram of a structure of another folded display terminal according to an embodiment of this application.
Figure 3A:
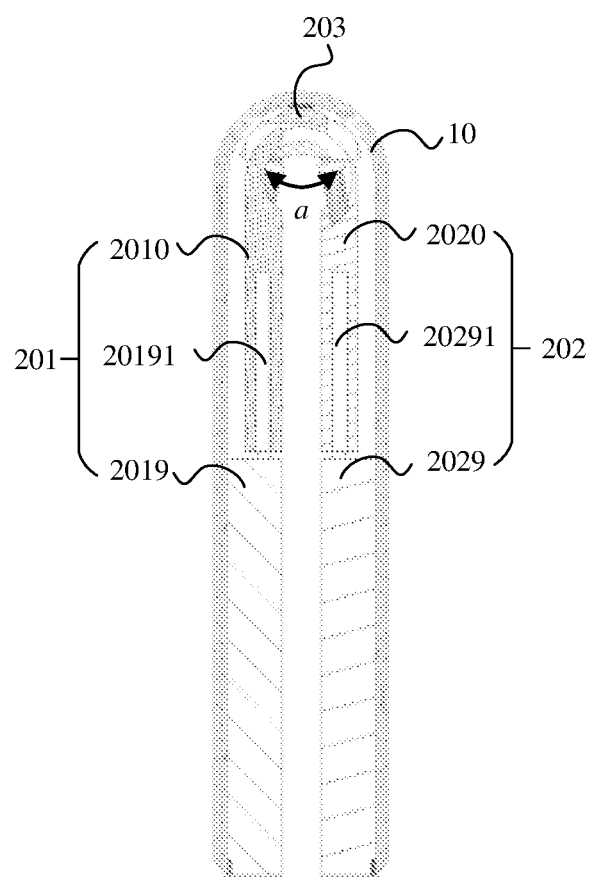
FIG. 3a is a schematic diagram of a structure of the folded display terminal in FIG. 3 in a folded state.
Figure 3B:
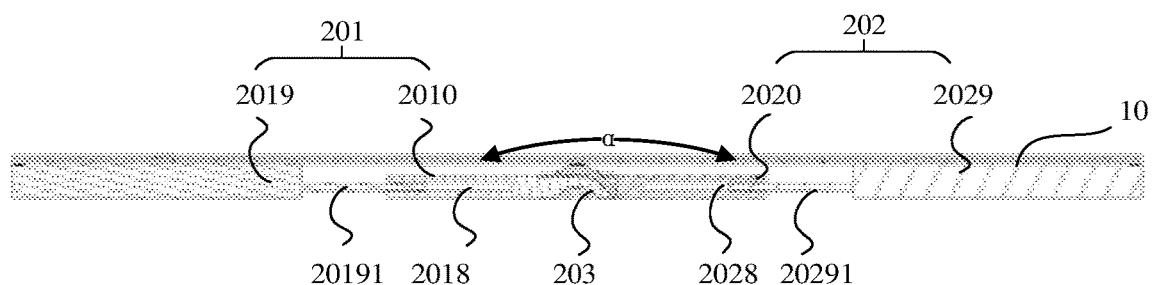
FIG. 3b is a schematic diagram of a structure of the folded display terminal in FIG. 3 in an unfolded state.

In another implementation of this application, refer to FIG. 3, FIG. 3a, and FIG. 3b. A first mechanical part 201 includes a first blade 2010 and a third blade 2019 that are sequentially disposed in a direction away from the rotating shaft 203. A second mechanical part 202 includes a second blade 2020 and a fourth blade 2029 that are sequentially disposed in the direction away from the rotating shaft 203. A part of a flexible screen 10 is fixed to the third blade 2019 by using an adhesive layer 30, a part of the flexible screen 10 is fixed to the fourth blade 2029 by using the adhesive layer 30, and a part of the flexible screen 10 is fixed to the rotating shaft 203 by using the adhesive layer 30. The first blade is further provided with, for example, a first groove 2018, and a first slider 20191 matching the first groove 2018 is disposed at a position, close to the first groove 2018, of the third blade 2019.

The first slider 20191 extends into the first groove 2018, and is slidably connected to the first groove 2018. In this way, when the first mechanical part 201 rotates around an axis O-O of the rotating shaft 203, the third blade 2019 can slide with respect to the first blade 2010 by a preset distance in a direction close to or away from the rotating shaft 203.

Similarly, the second blade 2020 is provided with a second groove 2028, and a second slider 20291 matching the second groove 2028 is disposed at a position, close to the second groove 2028, of the fourth blade 2029.

The second slider 20291 extends into the second groove 2028, and is slidably connected to the second groove 2028. In this way, when the second mechanical part 202 rotates around the axis O-O of the rotating shaft 203, the fourth blade 2029 can slide with respect to the second blade 2020 by a preset distance in the direction close to or away from the rotating shaft 203.

For example, as shown in FIG. 3a, when the first mechanical part 201 or the second mechanical part 202 or both rotate around the rotating shaft 203 so that an included angle α between the first mechanical part 201 and the second mechanical part 202 is 0°, the flexible screen is folded.

In a folding process of the flexible screen, the third blade drives the first slider 20191 to slide in the first groove 2018 of the first blade 2010 in the direction close to the rotating shaft 203, and the fourth blade 2029 drives the second slider 20291 to slide in the second groove 2028 of the second blade 2020 in the direction close to the rotating shaft 203. In this way, a part of bending force can be released, thereby reducing pulling force on the flexible screen, and avoiding excessive pulling force on the flexible screen in a bending process.

Alternatively, as shown FIG. 3b, when the first mechanical part 201 or the second mechanical part 202 or both rotate around the rotating shaft 203 so that the included angle α between the first mechanical part 201 and the second mechanical part 202 increases to 180°, the flexible screen is in an unfolded state.

In an unfolding process of the flexible screen, the third blade 2019 drives the first slider 20191 to slide in the first groove 2018 of the first blade 2010 in the direction away from the rotating shaft 203, and the fourth blade 2029 drives the second slider 20291 to slide in the second groove 2028 of the second blade 2020 in the direction away from the rotating shaft 203. In this way, a part of stretching force can be released, thereby reducing pulling force on the flexible screen, and avoiding excessive pulling force on the flexible screen in a stretching process.

According to the rotating mechanism provided in this embodiment of this application, the first blade is slidably connected to the third blade, and the second blade is slidably connected to the fourth blade, thereby further reducing pulling force of the third blade, the fourth blade, and the rotating shaft on the flexible screen, and improving flatness of the flexible screen.

Figure 4:
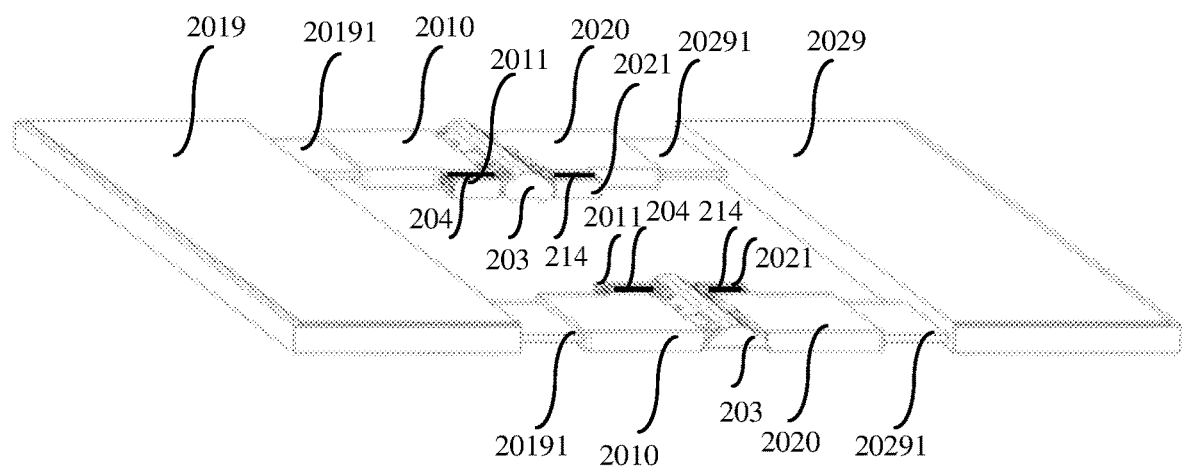
FIG. 4 is a schematic diagram of a structure of another rotating mechanism according to an embodiment of this application.

In another implementation of this application, as shown in FIG. 4, the rotating mechanism includes a rotating shaft 203, a first mechanical part 201, a second mechanical part 202, a third mechanical part 204, and a fourth mechanical part 214.

The first mechanical part 201 includes a first blade 2010 and a third blade 2019 that are sequentially disposed in a direction away from the rotating shaft 203. The second mechanical part 202 includes a second blade 2020 and a fourth blade 2029 that are sequentially disposed in the direction away from the rotating shaft 203.

The first blade 2010 is provided with a first slide groove 2011. One end of the third mechanical part 204 is connected to the rotating shaft 203, and the other end extends into the first slide groove 2011, and is slidably connected to the first slide groove 2011.

A first groove (which is not shown in the figure, and reference may be made to 2018 in FIG. 3*b*) is further disposed at a position, close to the third blade 2019, of the first blade 2010. A first slider 20191 matching the first groove is disposed on the third blade 2019, and the first slider 20191 extends into the first groove and is slidably connected to the first groove.

For structures of the second mechanical part 202 and the fourth mechanical part 214, refer to the description of the first mechanical part 201 and the third mechanical part 204. Details are not described herein again.

In this way, the third mechanical part 204 is slidably connected to the first side groove 2011, and the first slider 20191 is slidably connected to the first groove. Two sets of slidable components are disposed, so that pulling force of the first mechanical part and the second mechanical part on a flexible screen is further reduced during rotation, and flatness of the flexible screen is improved.

A specific structure of the rotating mechanism is not limited in this embodiment of this application. In an implementation of this application, as shown in FIG. 4, the rotating mechanism includes two rotating shafts 203 that are arranged sequentially in an axial direction, and a first mechanical part 201 and a second mechanical part 202 located on both sides of the rotating shafts 203.

The first mechanical part 201 includes two first blades 2010 and one third blade 2019.

One first blade 2010 and at least one third mechanical part 204 are connected to each rotating shaft 203, each first blade 2010 is provided with one first slide groove 2011, and the third mechanical part 204 is slidably connected to the first slide groove 2011.

One first groove is further disposed at one end, close to the third blade 2019, of each first blade 2010. Two first sliders 20191 matching the first groove are disposed on the third blade 2019. The first groove is slidably connected to the slider 20191.

For a specific structure of the second mechanical part 202, refer to the description of the first mechanical part 201. Details are not described herein again.

Figure 5:
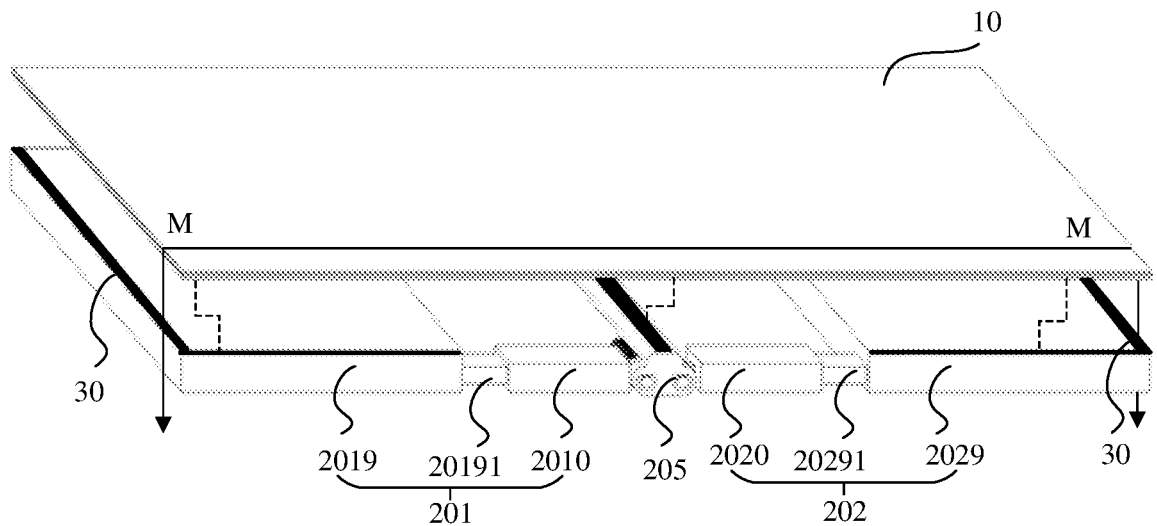
FIG. 5 is a schematic diagram of a structure of another folded display terminal according to an embodiment of this application.
Figure 5A:
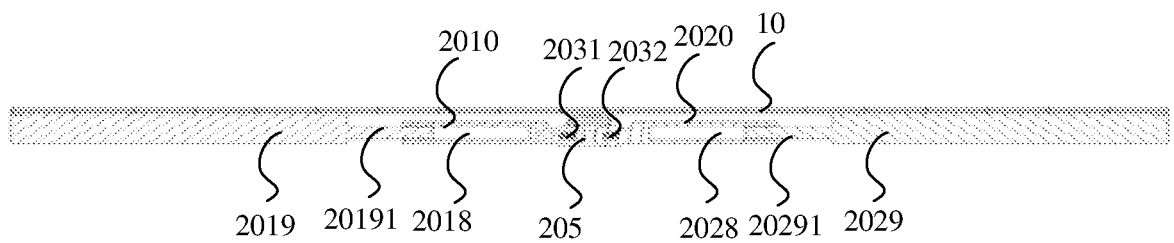
FIG. 5a is a sectional view M-M of FIG. 5.

An embodiment of this application further provides a rotating mechanism. FIG. 5 is a schematic diagram of a structure of another foldable display terminal according to an embodiment of this application. FIG. 5*a* is a sectional view M-M of FIG. 5. As shown in FIG. 5 and FIG. 5*a*, the rotating mechanism includes a first mechanical part 201, a second mechanical part 202, a third mechanical part 204, a fourth mechanical part 214, and a rotating shaft. The rotating shaft includes a first rotating shaft 2031 and a second rotating shaft 2032. For specific structures of the first mechanical part 201, the second mechanical part 202, the first rotating shaft 2031, and the second rotating shaft 2032, refer to the foregoing description. Details are not described herein again.

In an implementation of this application, as shown in FIG. 5 and FIG. 5*a*, the first mechanical part 201 includes a first blade 2010 and a third blade 2019 that are sequentially disposed in a direction away from the rotating shaft 203, and the second mechanical part 202 includes a second blade 2020 and a fourth blade 2029 that are sequentially disposed in the direction away from the rotating shaft 203.

The first blade 2010 is further provided with, for example, a first groove 2018, and a first slider 20191 matching the first groove is disposed at a position, close to the first groove 2018, of the third blade 2019.

The first slider 20191 extends into the first groove 2018, and is slidably connected to the first groove 2018.

Similarly, the second blade 2020 is provided with a second groove 2028, and a second slider 20291 matching the second groove 2028 is disposed at a position, close to the second groove 2028, of the fourth blade 2029.

The second slider 20291 extends into the second groove 2028, and is slidably connected to the second groove 2028.

In this way, the first blade is slidably connected to the third blade, and the second blade is slidably connected to the fourth blade, thereby reducing pulling force of the first mechanical part, the second mechanical part, and the rotating shaft on a flexible screen, and improving flatness of the flexible screen.

Still refer to FIG. 5 and FIG. 5*a*. The rotating mechanism further includes, for example, a connector 205. The connector 205 may be a C-shaped clasp. For ease of description, in this embodiment of this application, a connection relationship between the connector 205 and the rotating shaft is described by using the C-shaped clasp as an example. The C-shaped clasp does not constitute a limitation on a structure form of the connector 205. The first rotating shaft 2031 is connected to the second rotating shaft 2032 through the connector 205.

Figure 6:
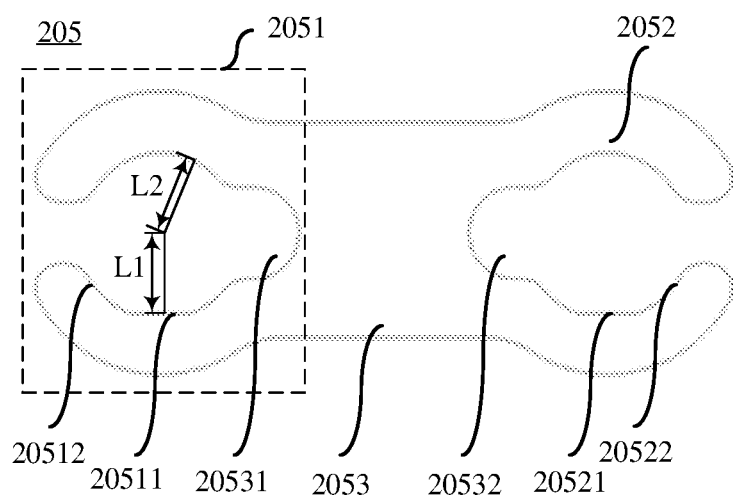
FIG. 6 is a schematic diagram of a structure of a connector in FIG. 5.

For example, FIG. 6 is a schematic diagram of a structure of the connector in FIG. 5. As shown in FIG. 6, the connector 205 includes at least a first C-shaped clasp 2051. The first C-shaped clasp 2051 is sleeved on the first rotating shaft 2031. When the first mechanical part 201 rotates, the first C-shaped clasp 2051 does not move, and the first rotating shaft 2031 rotates in the first C-shaped clasp 2051.

During rotation of the first rotating shaft 2031, the first C-shaped clasp 2051 generates first deformation or second deformation. A deformation value of the second deformation is greater than a deformation value of the first deformation. When the first rotating shaft rotates to a specific angle interval, the first C-shaped clasp 2051 changes from the second deformation to the first deformation, and energy released by the first C-shaped clasp 2051 can provide a torque for the first rotating shaft 2031, to drive the first rotating shaft 2031 to rotate, and further drive the third mechanical part 204 and the first mechanical part 201 to rotate accordingly, thereby achieving automatic flattening and folding of the flexible screen. In addition, when deformation of the first C-shaped clasp 2051 is the first deformation, holding force can be provided for the third mechanical part 204 and the first mechanical part 201. The following is described with reference to FIG. 6, FIG. 7a, FIG. 7b, and FIG. 8.

As shown in FIG. 6, there is an opening on one side of the first C-shaped clasp 2051, and an inner side of the first C-shaped clasp 2051 has a first flat surface 20511, a first curved surface 20512, and a first concave portion 20531 opposite to the opening portion.

A distance between the first flat surface 20511 and a center of the first C-shaped clasp is L1, and a distance between the first curved surface 20512 and the center of the first C-shaped clasp is equal to L2. A distance between the first concave portion 20531 and the center of the first C-shaped clasp is greater than L2.

Figure 7A:
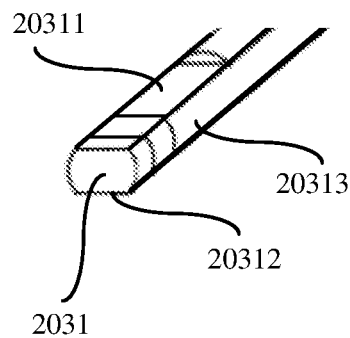
FIG. 7a is a schematic diagram of a structure of a first rotating shaft in FIG. 5.

FIG. 7a is a schematic diagram of a structure of the first rotating shaft in FIG. 5. As shown in FIG. 7a, the first rotating shaft 2031 is a columnar structure. A surface that is of the first rotating shaft 2031 and that is configured to come into contact with the C-shaped clasp includes: a third flat surface 20311 and a fifth flat surface 20312 matching the first flat surface 20511, and a second curved surface 20313 matching the first curved surface 20512.

In this application, a relative position relationship between the third flat surface 20311 and the fifth flat surface 20312 is not limited, as long as when the first rotating shaft 2031 rotates to a preset position in the first C-shaped clasp, the third flat surface 20311 can fit the first flat surface of the first C-shaped clasp, and at the same time, the fifth flat surface 20312 can fit the first concave portion or the opening of the first C-shaped clasp.

In an implementation of this application, as shown in FIG. 7a, the third flat surface 20311 and the fifth flat surface 20312 are disposed opposite to each other.

Figure 7B:
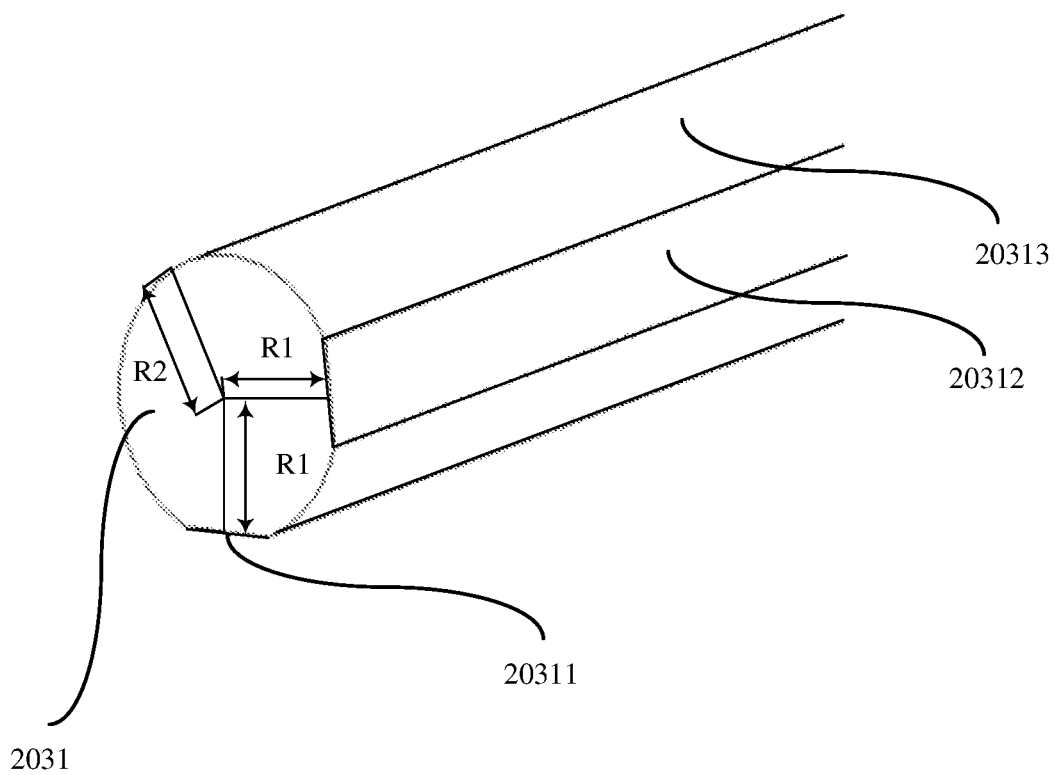
FIG. 7b is a schematic diagram of a structure of another first rotating shaft in FIG. 5.

In another implementation of this application, as shown in FIG. 7b, an included angle between the third flat surface 20311 and the fifth flat surface 20312 may be 90°. Both a distance between the fifth flat surface 20312 and an axis of the first rotating shaft 2031 and a distance between the third flat surface 20311 and the axis of the first rotating shaft 2031 are R1, and R1=L1. A radius of the second curved surface 20313 of the first rotating shaft 2031 is R2, and R2=L2.

Figure 8:
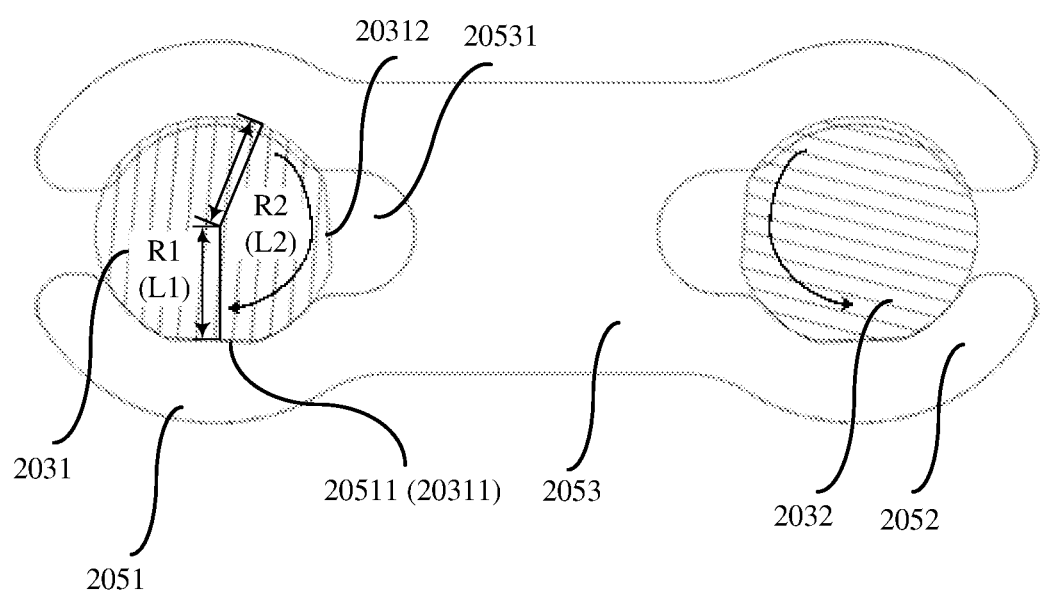
FIG. 8 is a diagram of a working state of a rotating mechanism in FIG. 5.

As shown in FIG. 8, the first flat surface 20511 of the first C-shaped clasp 2051 is in contact with the third flat surface 20311 of the first rotating shaft 2031, and the fifth flat surface 20312 of the first rotating shaft 2031 is located at the first concave portion 20531 of the connecting portion. The distance R1 between the third flat surface 20311 and the axis of the first rotating shaft is equal to the distance L1 between the first flat surface 20511 and the center of the first C-shaped clasp. The distance R1 between the fifth flat surface 20312 and the axis of the first rotating shaft is less than the distance between the first concave portion 20531 and the center of the first C-shaped clasp. In this case, force at positions inside the first C-shaped clasp is even, and deformation of the first C-shaped clasp 2051 is the first deformation.

It can be understood that, starting from the state shown in FIG. 8, when the first mechanical part 201 drives the first rotating shaft 2031 to rotate in a clockwise direction or in a counterclockwise direction, the third flat surface 20311 of the first rotating shaft leaves the first flat surface 20511 of the first C-shaped clasp, the fifth flat surface 20312 of the first rotating shaft leaves the first concave portion of the first C-shaped clasp, and the second curved surface 20313 of the first rotating shaft 2031 comes into contact with the first flat surface 20511 of the first C-shaped clasp. The radius R2 of the second curved surface 20313 of the first rotating shaft 2031 is greater than the distance L1 between the first flat surface 20511 and the center of the first C-shaped clasp. The second curved surface 20313 of the first rotating shaft 2031 generates thrust on the first flat surface 20511 of the first C-shaped clasp. Deformation of the first C-shaped clasp 2051 is the second deformation.

Therefore, a position at which the C-shaped clasp is subjected to the first deformation can be used as a flattened position or a folded position of the flexible screen, to provide holding force for folding or flattening of the flexible screen. In addition, when the first rotating shaft rotates to a specific angle interval, for example, when the fifth flat surface 20312 starts to come into contact with the first flat surface 20511, a torque provided by energy released by the C-shaped clasp can drive the first rotating shaft to rotate even if there is no external force, to drive the first mechanical part to rotate accordingly. This achieves automatic flattening and folding of the flexible screen, and improves user experience.

For example, when the first mechanical part 201 and the second mechanical part 202 are in a folded state or an unfolded state, an included angle between the first mechanical part 201 and the second mechanical part 202 is, for example, 0° or 180°, and the third flat surface 20311 or the fifth flat surface 20312 fits the first flat surface 20511. In this case, deformation of the first C-shaped clasp is the first deformation.

For example, when the first mechanical part 201 and the second mechanical part 202 are in a state between the folded state and the unfolded state, an included angle between the first mechanical part 201 and the second mechanical part 202 is between 0° and 180°, and the second curved surface 20313 of the first rotating shaft 2031 is in contact with the first flat surface 20511. In this case, deformation of the first C-shaped clasp is the second deformation.

In this way, when the first C-shaped clasp changes from the second deformation to the first deformation, the first C-shaped clasp springs back and releases energy, to provide a torque for rotation of the first mechanical part. Therefore, when the rotating mechanism is closing, closing force can be provided to make a folding process easier. In an initial phase from the folded state to a flattened state of the rotating mechanism, proper resistance is provided to avoid too fast unfolding of the flexible screen. When the rotating mechanism is unfolded to a specific angle, proper assistance is provided to achieve automatic flattening, and after the rotating mechanism is unfolded, flattening holding force is provided.

In another implementation of this application, the connector 205 further includes a second C-shaped clasp 2052 whose opening direction is opposite to an opening direction of the first C-shaped clasp 2051. The second C-shaped clasp 2052 is sleeved on the second rotating shaft 2032. The first C-shaped clasp 2051 is connected to the second C-shaped clasp 2052 through a connecting portion 2053.

In this way, when the first mechanical part 201 rotates, the first C-shaped clasp 2051 does not move, and the first rotating shaft 2031 rotates in the first C-shaped clasp 2051. When the second mechanical part 202 rotates, the second C-shaped clasp 2052 does not move, and the second rotating shaft 2032 rotates in the second C-shaped clasp 2052.

For a structure and a working process of the second C-shaped clasp 2052, refer to the description of the first C-shaped clasp 2051. For a structure and a working process of the second rotating shaft 2032, refer to the description of the first rotating shaft 2031. Details are not described herein again.

According to the rotating mechanism provided in this embodiment of this application, C-shaped clasps are disposed, so that a torque can be provided for rotation of the first rotating shaft and the second rotating shaft. The first rotating shaft and the second rotating shaft can transmit the torque to the first mechanical part and the second mechanical part through the third mechanical part and the fourth mechanical part, so as to finally act on the flexible screen, and provide holding force for folding or flattening of the flexible screen.

Figure 9:
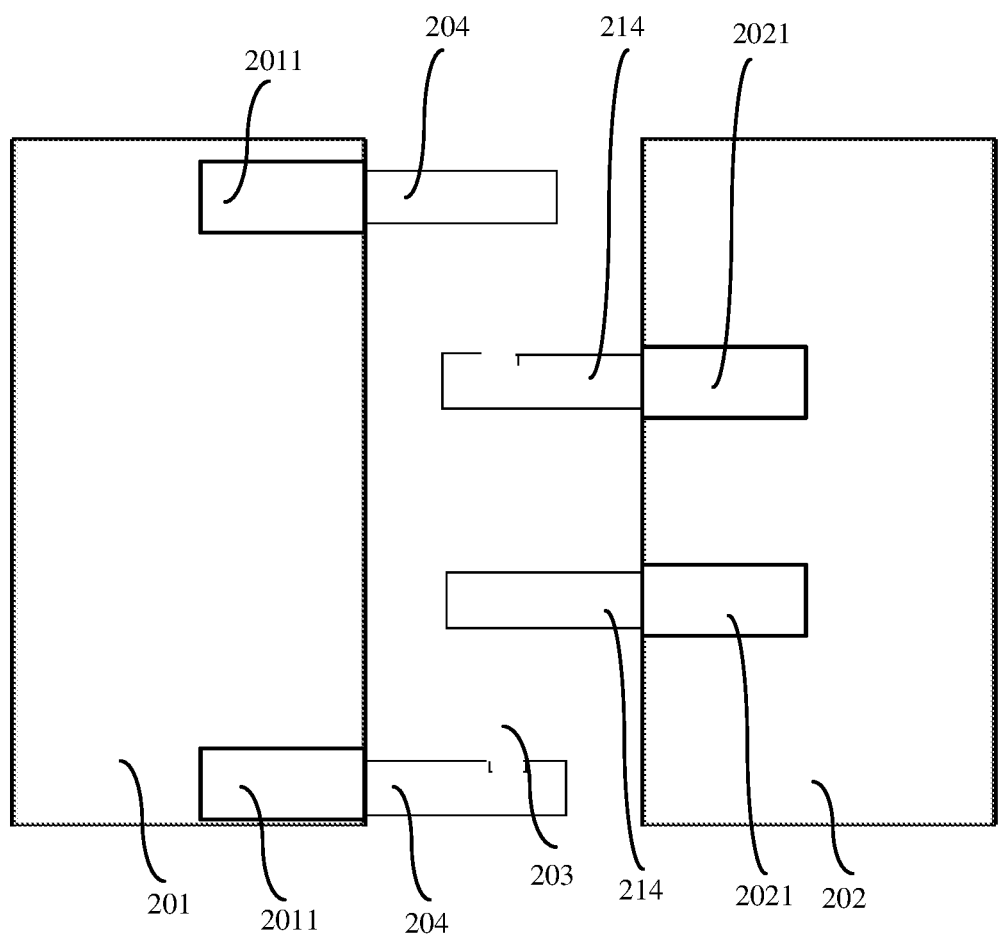
FIG. 9 is a schematic diagram of a structure of another rotating mechanism according to an embodiment of this application.

An embodiment of this application further provides a rotating mechanism. FIG. 9 is a schematic diagram of a structure of another rotating mechanism according to an embodiment of this application. As shown in FIG. 9, the rotating mechanism includes a first mechanical part 201, a second mechanical part 202, a third mechanical part 204, a fourth mechanical part 214, and a rotating shaft 203.

The first mechanical part 201 is provided with a first slide groove 2011, and the second mechanical part 202 is provided with a second slide groove 2021.

A first end of the third mechanical part 204 is rotatably connected to the rotating shaft 203, and a second end of the third mechanical part 204, as shown in FIG. 2, may extend into the first slide groove 2011, and be slidably connected to the first slide groove 2011.

A first end of the fourth mechanical part 214 is rotatably connected to the rotating shaft 203, and a second end of the fourth mechanical part 214 may extend into the second slide groove 2021, and be slidably connected to the second slide groove 2021.

For a sliding connection structure between the third mechanical part 204 and the first slide groove 2011, and for a sliding connection structure between the fourth mechanical part 214 and the second slide groove 2021, refer to the description of FIG. 2. Details are not described herein again.

There are two rotating shafts 203, the two rotating shafts 203 are arranged sequentially from top to bottom. Each rotating shaft is connected to one third mechanical part 204 and one fourth mechanical part 214. There are one first mechanical part 201 and one second mechanical part 202. Each first mechanical part 201 is provided with two first slide grooves 2011, and each second mechanical part 202 is provided with two second slide grooves 2021. Each third mechanical part corresponds to one first slide groove 2011, and each fourth mechanical part 214 corresponds to one second slide groove 2021.

Figure 10:
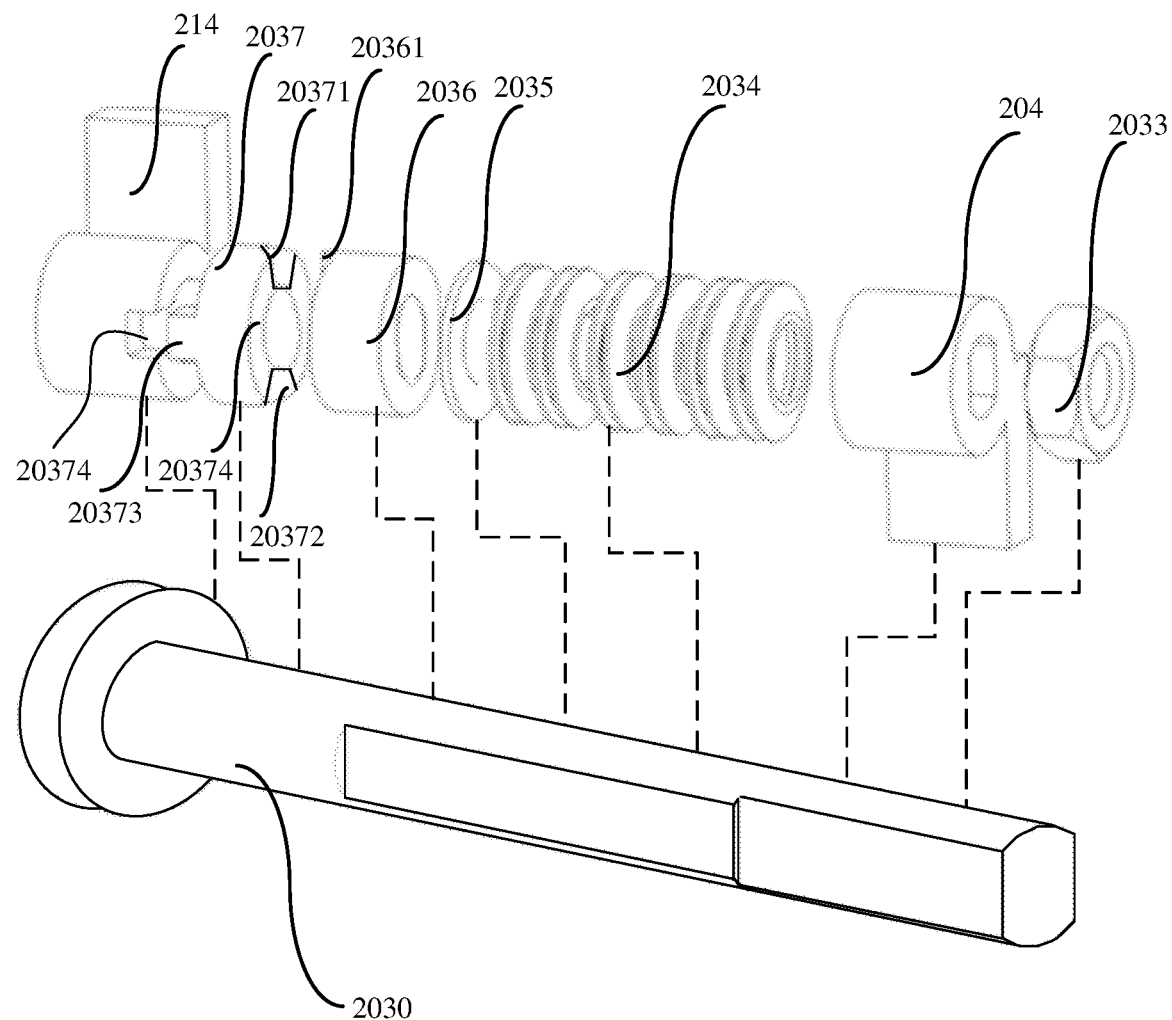
FIG. 10 is a schematic diagram of a structure of a rotating shaft in FIG. 9.

FIG. 10 is a schematic diagram of a structure of the rotating shaft in FIG. 9. As shown in FIG. 10, the rotating shaft 203 includes a third rotating shaft 2030. The third rotating shaft 2030 is sequentially sleeved with a nut 2033, a third mechanical part 204, a first elastic component 2034, a flat washer 2035, a cam 2036, a concave wheel 2037, and a fourth mechanical part 214.

The elastic component 2034 is, for example, a belleville washer.

Both a fitting surface between the third rotating shaft 2030 and the fourth mechanical part 214 and a fitting surface between the third rotating shaft 2030 and the concave wheel 2037 are smooth cylindrical surfaces. Therefore, the fourth mechanical part 214 and the concave wheel 2037 can rotate around the third rotating shaft 2030.

A fitting surface between the third rotating shaft 2030 and the cam 2036, a fitting surface between the third rotating shaft 2030 and the flat washer 2035, a fitting surface between the third rotating shaft 2030 and the elastic component 2034, and a fitting surface between the third rotating shaft 2030 and the third mechanical part 204 all are smooth prism surfaces. Therefore, the cam 2036 can slide only in an axial direction of the third rotating shaft 2030, to compress or release the elastic component 2034 and the flat washer 2035. In addition, when the first mechanical part 201 rotates, the third rotating shaft 2030 can be driven to rotate.

The nut 2033 is fixedly connected to an end position of the third rotating shaft 2030. The nut is configured to limit the third mechanical part 204, the first elastic component 2034, the flat washer 2035, the cam 2036, the concave wheel 2037, and the fourth mechanical part 214 to being on the rotating shaft, to prevent the third mechanical part 204, the first elastic component 2034, the flat washer 2035, the cam 2036, the concave wheel 2037, and the fourth mechanical part 214 from being disengaged during use.

A bump 20373 is disposed on the concave wheel 2037, and a recess 20374 matching the bump is disposed on the fourth mechanical part 214. During working, the bump 20373 is inserted into the recess 20374, and when the fourth mechanical part 214 rotates around the third rotating shaft 2030, the concave wheel 2037 can rotate accordingly.

A convex portion 20361 is disposed on the cam 2036. The concave wheel 2037 is provided with a flat portion 20374, and a first concave portion 20371 and a second concave portion 20372 that match the convex portion 20361.

During rotation of the third rotating shaft 2030, the convex portion 20361 on the cam 2036 rotates to be moved into the first concave portion 20371 and the second concave portion 20372 on the concave wheel 2037. Deformation of the first elastic component 2034 is first deformation.

The third rotating shaft 2030 continues to rotate, and the convex portion 20361 on the cam 2036 rotates to move out of the first concave portion 20371 and the second concave portion 20372 on the concave wheel 2037, and to come into contact with the flat portion 20374. Deformation of the first elastic component 2034 is second deformation.

A deformation value of the second deformation is greater than a deformation value of the first deformation.

When the first elastic component 2034 restores from the second deformation to the first deformation, energy released by the first elastic component 2034 may provide a torque for the third rotating shaft 3020, to drive the third rotating shaft 2030 to rotate, and further drive the third mechanical part 204 and the first mechanical part 201 to rotate accordingly. This achieves automatic flattening and folding of a flexible screen. In addition, when the convex portion 20361 on the cam 2036 is located in the first concave portion 20371 and the second concave portion 20372 on the concave wheel 2037, holding force may be provided for the third mechanical part 204 and the first mechanical part 201.

The following is described with reference to FIG. 11.

Figure 11:
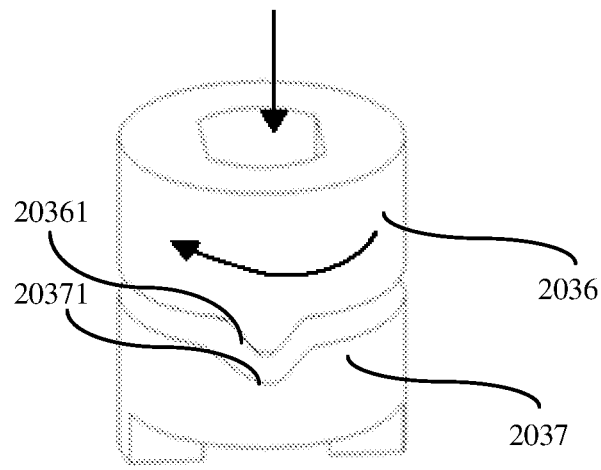
FIG. 11 is a diagram illustrating a state of fitting between a concave wheel and a cam in FIG. 10.

As shown in FIG. 11, the convex portion 20361 on the cam 2036 fits the first concave portion 20371 of the concave wheel 2037. In this case, the first elastic component 2034 generates the first deformation.

It can be understood that, when the fourth mechanical part 214 rotates around the third rotating shaft 2030, the concave wheel 2037 rotates accordingly, and the convex portion

20361 on the cam 2036 gradually rotates to move out of the first concave portion 20371 or the second concave portion 20372, and to come into contact with the flat portion 20374, so that the cam 2036 slides along the third rotating shaft 2030 in a direction away from the concave wheel 2037. The first elastic component 2034 generates second deformation.

Alternatively, when the third mechanical part 204 rotates, the third rotating shaft 2030 rotates accordingly, to drive the convex portion on the cam 2036 to gradually rotate to move out of the first concave portion 20371 or the second concave portion 20372 of the concave wheel 2037, so that the cam 2036 slides along the third rotating shaft 2030 in a direction away from the concave wheel 2037. The first elastic component 2034 generates second deformation.

When the fourth mechanical part 214 continues to rotate around the third rotating shaft 2030, or the third mechanical part 204 continues to rotate to drive the third rotating shaft 2030 to rotate, until the concave portion of the concave wheel rotates again to a position at which the convex portion of the cam is located, the first elastic component 2034 and the flat washer spring back and release energy, to provide a torque for the shaft, so that the cam returns to the concave portion of the concave wheel under action of the spring. The first elastic component 2034 generates the first deformation.

A fitting position of the cam and the concave wheel can be used as a flattened position or a folded position of the flexible screen, and holding force can be provided for folding or flattening of the flexible screen.

For example, when the third mechanical part 204 and the fourth mechanical part 214 are in a folded state or an unfolded state, an angle between the third mechanical part 204 and the fourth mechanical part 214 is, for example, 0° or 180°, and the convex portion on the cam fits the at least one concave portion. Deformation of the first elastic component is the first deformation.

When the third mechanical part 204 and the fourth mechanical part 214 are in a state between a folded state and an unfolded state, an included angle between the third mechanical part 204 and the fourth mechanical part 214 is between 0° and 180°, and the convex portion on the cam is in contact with the flat portion. Deformation of the first elastic component is the second deformation.

In this way, when the first elastic component 2034 restores from the second deformation to the first deformation, the first elastic component springs back and releases energy, to provide a torque for the third mechanical part and the fourth mechanical part. Therefore, when the rotating mechanism is closing, closing force can be provided to make a folding process easier. In an initial phase from the folded state to a flattened state of the rotating mechanism, the first elastic component 2034 first changes from the first deformation to the second deformation, to provide proper resistance for the third mechanical part and the fourth mechanical part, thereby avoiding too fast unfolding of the flexible screen. When the rotating mechanism is unfolded to a specific angle, the first elastic component 2034 then restores from the second deformation to the first deformation, to provide proper assistance for the third mechanical part and the fourth mechanical part, thereby achieving automatic flattening. After the unfolding, deformation of the first elastic component 2034 is the first deformation, to provide flattening holding force for the third mechanical part and fourth mechanical part.

According to the rotating mechanism provided in this embodiment of this application, the elastic component is disposed, and the concave wheel fits the cam, so that a torque can be provided for rotation of the third rotating shaft. The third rotating shaft may transmit the torque to the first mechanical part and the second mechanical part through the third mechanical part and fourth mechanical part, so as to finally act on the flexible screen, and provide holding force for folding or flattening of the flexible screen.

In addition, when the cam and the concave wheel move to a specific angle interval, for example, when the cam starts to enter the concave wheel, the third mechanical part or the fourth mechanical part can be driven to rotate without providing external force at this position, thereby achieving automatic flattening or automatic folding of the flexible screen, and improving user experience.

Figure 12:
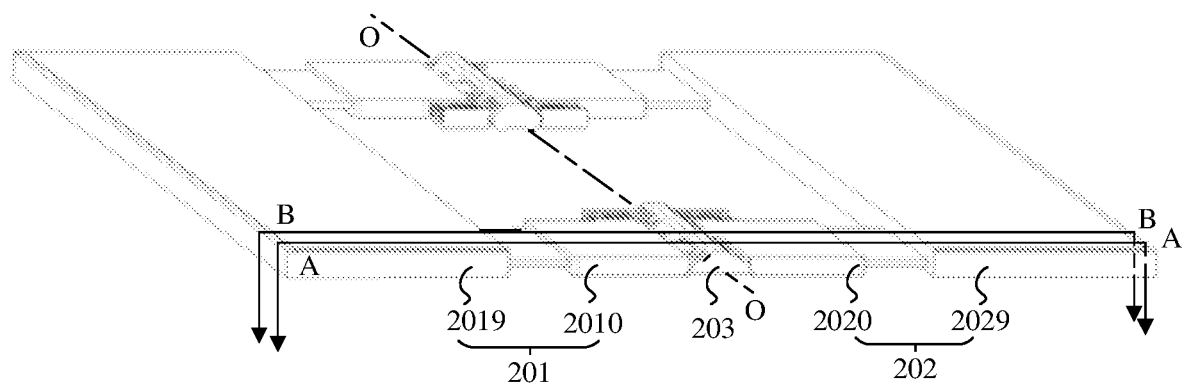
FIG. 12 is a schematic diagram of a structure of another rotating mechanism according to an embodiment of this application.

An embodiment of this application further provides a rotating mechanism. FIG. 12 is a schematic diagram of a structure of another rotating mechanism according to an embodiment of this application. As shown in FIG. 12, the rotating mechanism includes a first mechanical part 201, a second mechanical part 202, and a rotating shaft 203 located between the first mechanical part 201 and the second mechanical part 202.

The first mechanical part 201 includes a first blade 2010 and a third blade 2019 that are sequentially disposed in a direction away from the rotating shaft 203. The second mechanical part 202 includes a second blade 2020 and a fourth blade 2029 that are sequentially disposed in the direction away from the rotating shaft 203.

For a slidable connection structure between the first blade 2010 and the third blade 2019, refer to the descriptions corresponding to FIG. 3, FIG. 3*a*, and FIG. 3*b*. Details are not described herein again.

Figure 13:
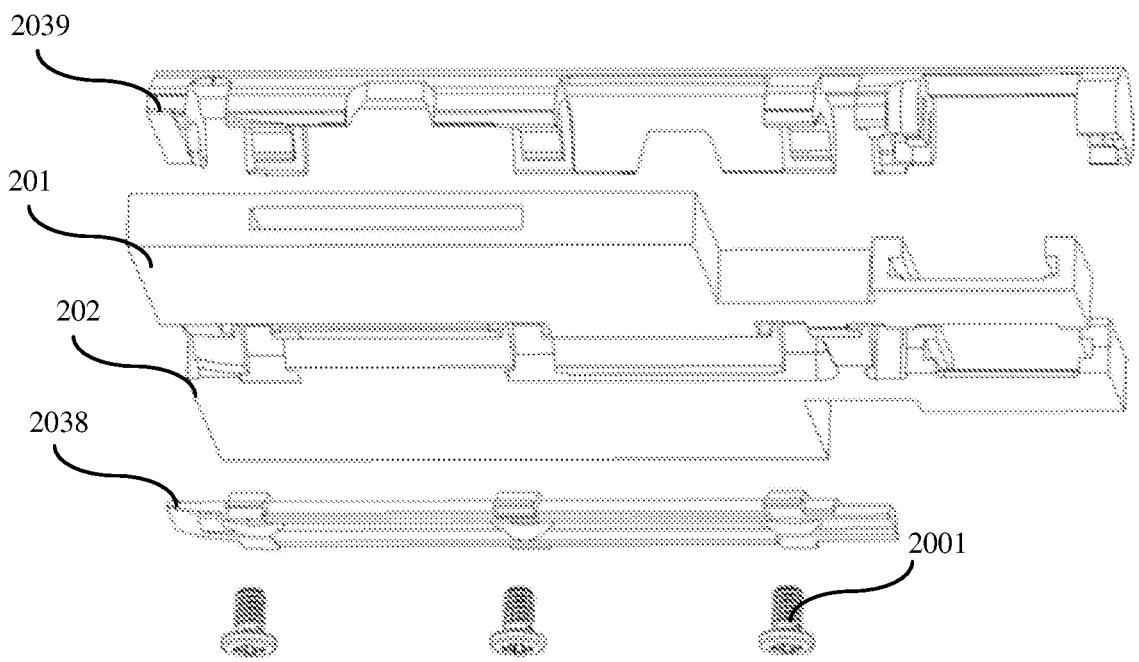
FIG. 13 is a schematic diagram of a disassembled structure of the rotating mechanism in FIG. 12.
Figure 14:
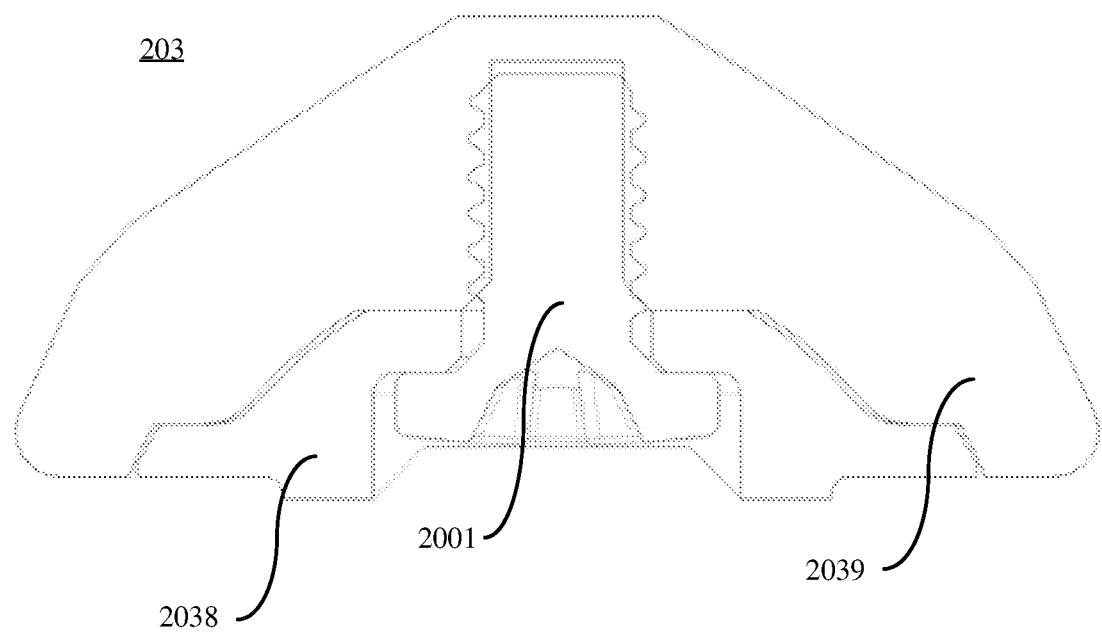
FIG. 14 is a schematic diagram of a structure of a rotating shaft in FIG. 12.
Figure 15:
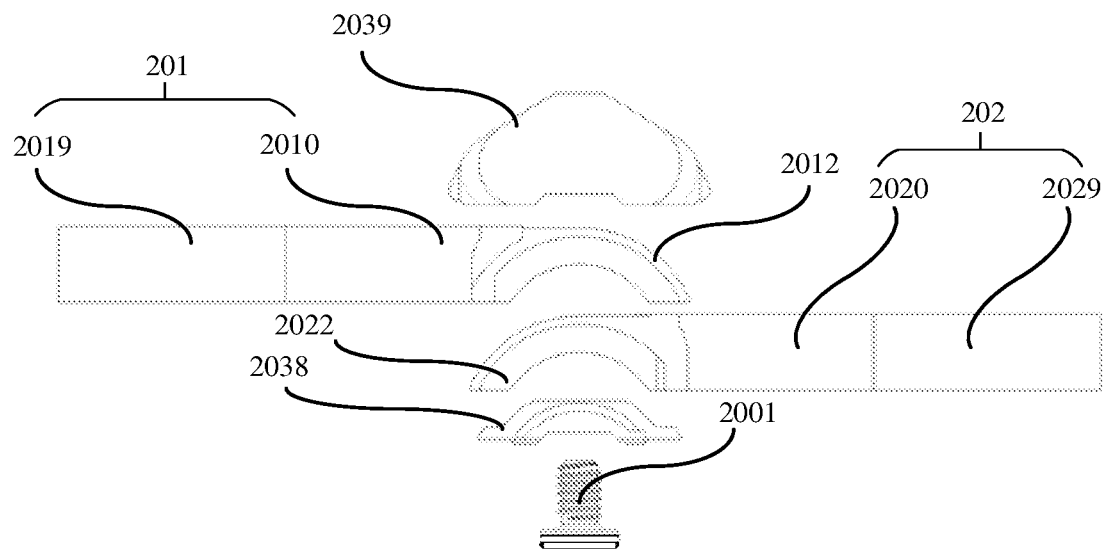
FIG. 15 is a schematic diagram of another disassembled structure of the rotating mechanism in FIG. 12.
Figure 16:
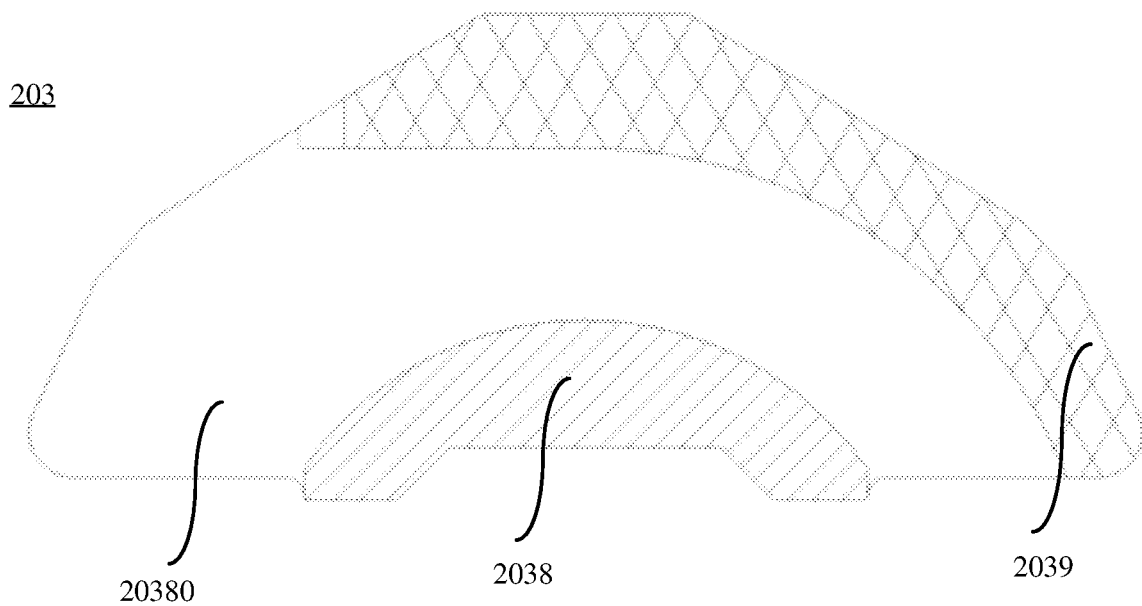
FIG. 16 is a schematic diagram of another structure of a rotating shaft in FIG. 12.
Figure 17:
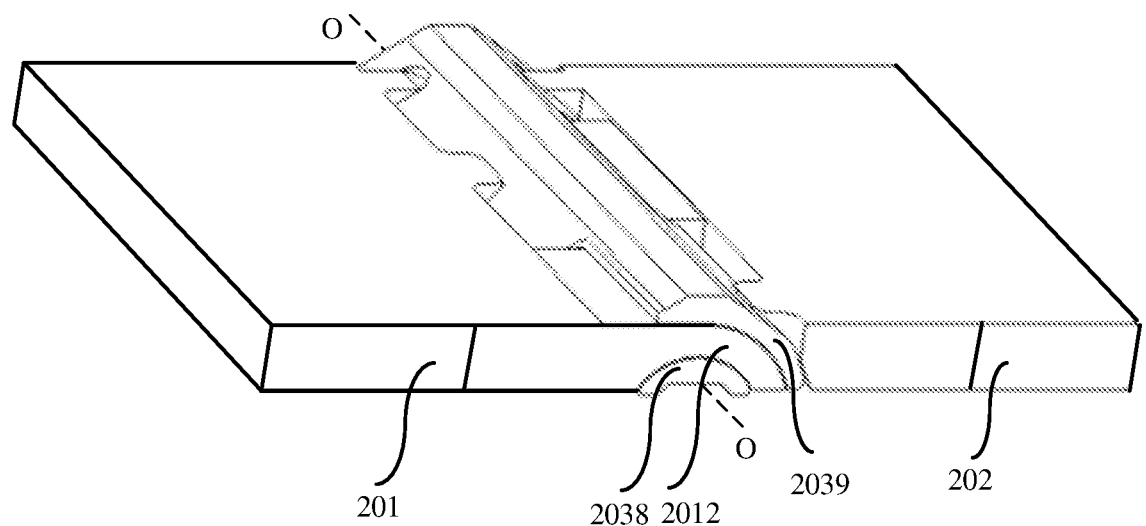
FIG. 17 is a sectional view A-A of FIG. 12.
Figure 17A:
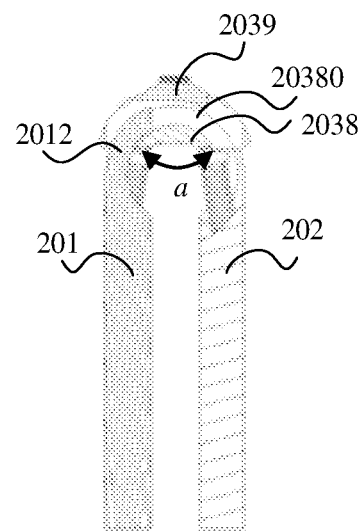
FIG. 17a is a diagram of a folded state of a rotating mechanism in FIG. 17.
Figure 18:
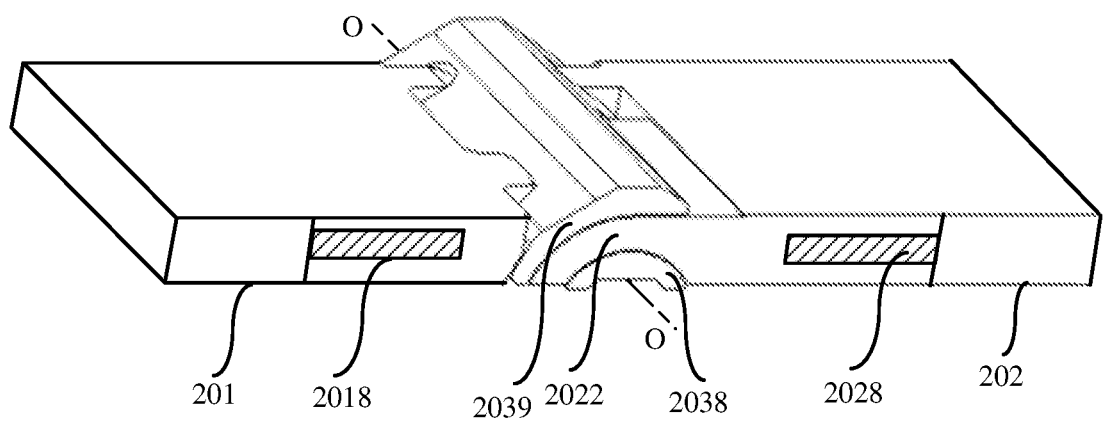
FIG. 18 is a sectional view B-B of FIG. 12.
Figure 18A:
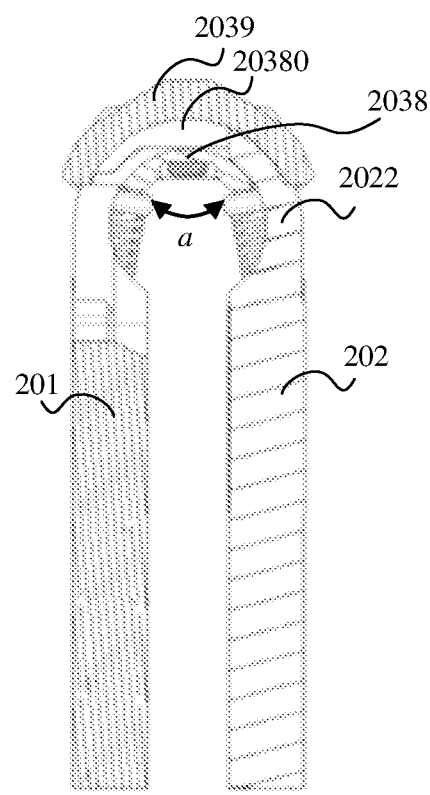
FIG. 18a is a diagram of a folded state of a rotating mechanism in FIG. 18.

In addition, as shown in FIG. 13 and FIG. 14, the rotating shaft 203 includes an inner guide shaft 2038 and an outer guide shaft 2039, and the inner guide shaft 2038 is covered by the outer guide shaft 2039. The inner guide shaft 2038 may be fixedly connected to the outer guide shaft 2039 through a screw 2001.

As shown in FIG. 15, FIG. 16, FIG. 17, FIG. 17*a*, FIG. 18, and FIG. 18*a*, an outer diameter of the inner guide shaft is, for example, less than an inner diameter of the outer guide shaft. An outer arc is arranged on one side, facing the outer guide shaft 2039, of the inner guide shaft 2038. An inner arc is disposed on one side, facing the inner guide shaft 2038, of the outer guide shaft 2039. The outer arc is disposed opposite to the inner arc, and the inner arc and the outer arc enclose an arc-shaped slide rail 20380.

A first rotating member 2012 is disposed on one side, close to the rotating shaft 203, of the first mechanical part 201. The first rotating member 2012 is located in the slide rail 20380 between the inner guide shaft 2038 and the outer guide shaft 2039. When the first mechanical part 201 rotates, the first rotating member 2012 rotates accordingly in the slide rail and around the inner guide shaft 2038.

Similarly, a second rotating member 2022 is disposed on one side, close to the rotating shaft 203, of the second mechanical part 202. The second rotating member 2022 is located in the slide rail 20380 between the inner guide shaft 2038 and the outer guide shaft 2039. When the second mechanical part 202 rotates, the second rotating member 2022 rotates accordingly in the slide rail 20380.

The first rotating member 2012 and the second rotating member 2022 are sequentially spaced apart along an axis O-O, and the first rotating member 2012 and the second rotating member 2022 share an axis. In this way, coaxial rotation of the first mechanical part 201 and the second mechanical part 202 is achieved.

Figure 19:
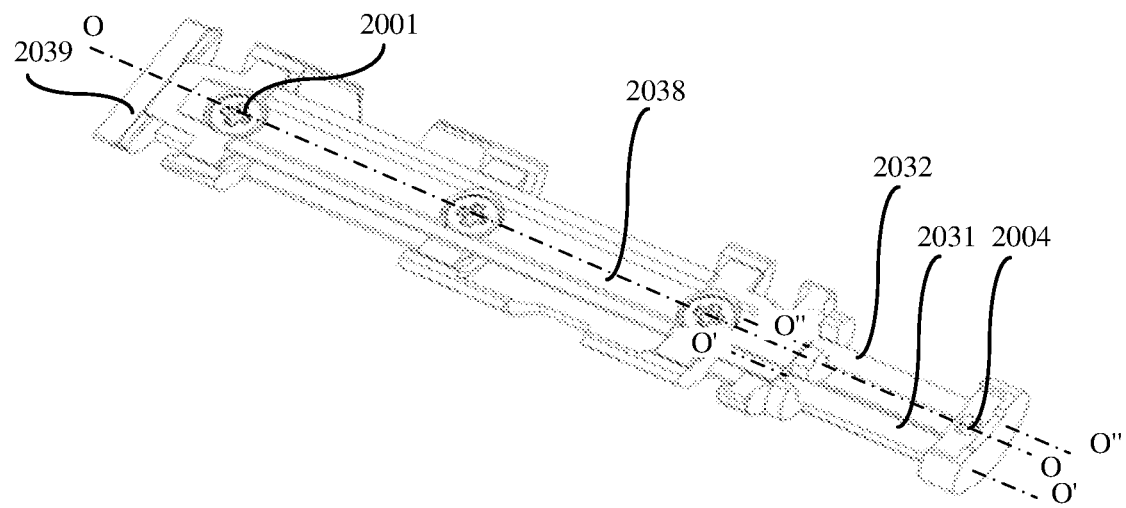
FIG. 19 is a schematic diagram of a structure of a rotating shaft in FIG. 12.
Figure 19A:
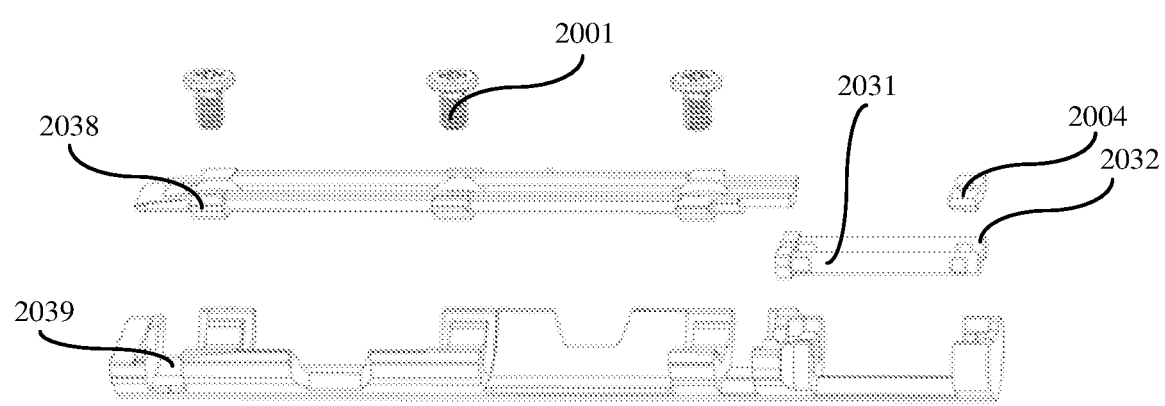
FIG. 19a is a schematic diagram of a disassembled structure of a rotating shaft in FIG. 12.

As shown in FIG. 19 and FIG. 19a, the rotating shaft 203 further includes a first rotating shaft 2031 and a second rotating shaft 2032.

A length of the inner guide shaft 2038 is less than a length of the outer guide shaft 2039. A first end in a length direction of the outer guide shaft 2039 extends in the length direction with respect to a first end in a length direction of the inner guide shaft 2038. The first end in the length direction of the inner guide shaft 2038 is close to the first end in the length direction of the outer guide shaft 2039, or is flush with the first end in the length direction of the outer guide shaft 2039. The first rotating shaft 2031 and the second rotating shaft 2032 are disposed between the first end in the length direction of the inner guide shaft 2038 and the first end in the length direction of the outer guide shaft 2039.

A cover 2004 is further disposed at an opening of the outer guide shaft 2039, and the cover 2004 is configured to fix the first rotating shaft 2031 and the second rotating shaft 2032 in the outer guide shaft 2039.

As shown in FIG. 19, an axis of the first rotating shaft 2031 is, for example, O'-O'. The first mechanical part 201 is rotatably connected to the first rotating shaft 2031 through the third mechanical part 204, and the first mechanical part 201 may rotate around the axis O'-O'.

Similarly, an axis of the second rotating shaft 2032 is, for example, O"-O". The second mechanical part 202 is rotatably connected to the second rotating shaft 2032 through the fourth mechanical part 214, and the second mechanical part 202 may rotate around the axis O"-O".

An axis O-O of a flexible screen is different from the axis O"-O" of the first mechanical part and the axis O"-O" of the second mechanical part. The first mechanical part and the second mechanical part are prone to generate relatively large pulling force on the flexible screen during rotation, affecting flatness of the flexible screen.

Figure 20:
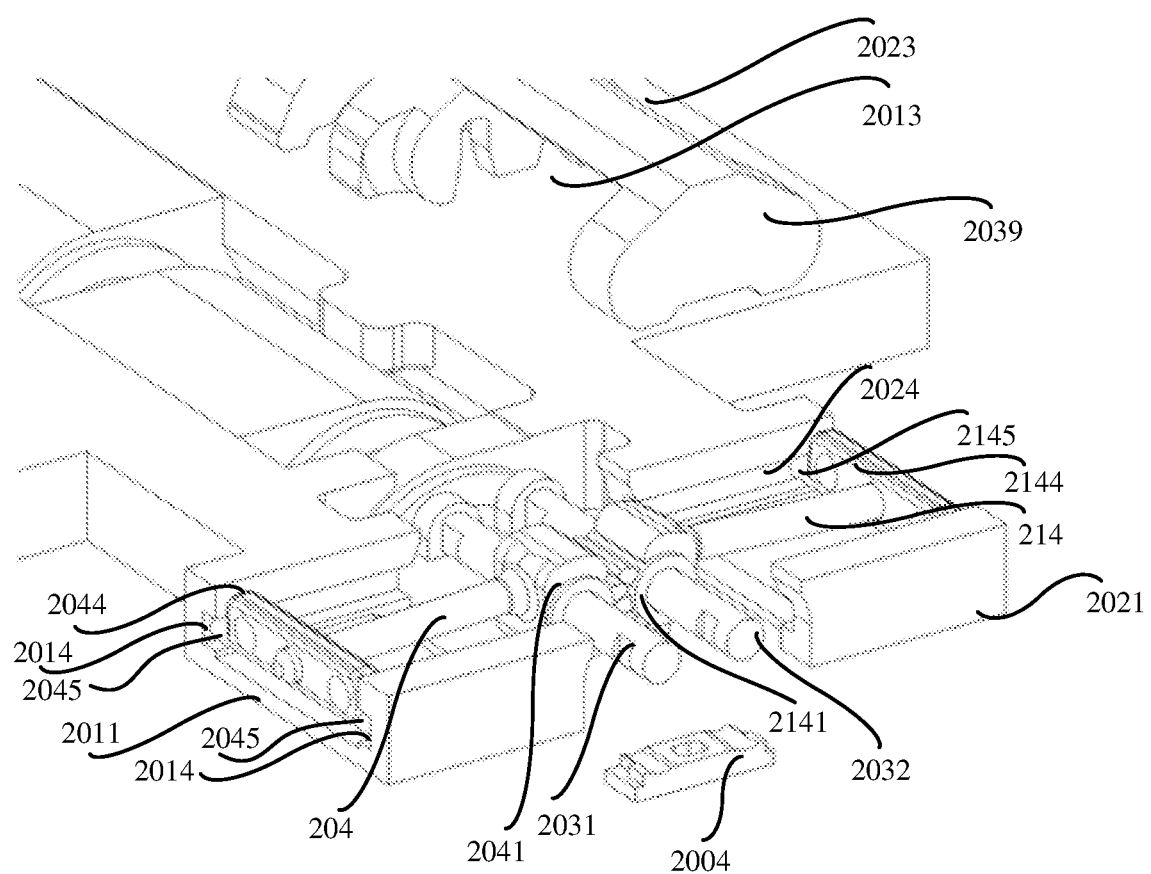
FIG. 20 is a schematic diagram of a structure of another rotating mechanism according to an embodiment of this application.
Figure 20A:
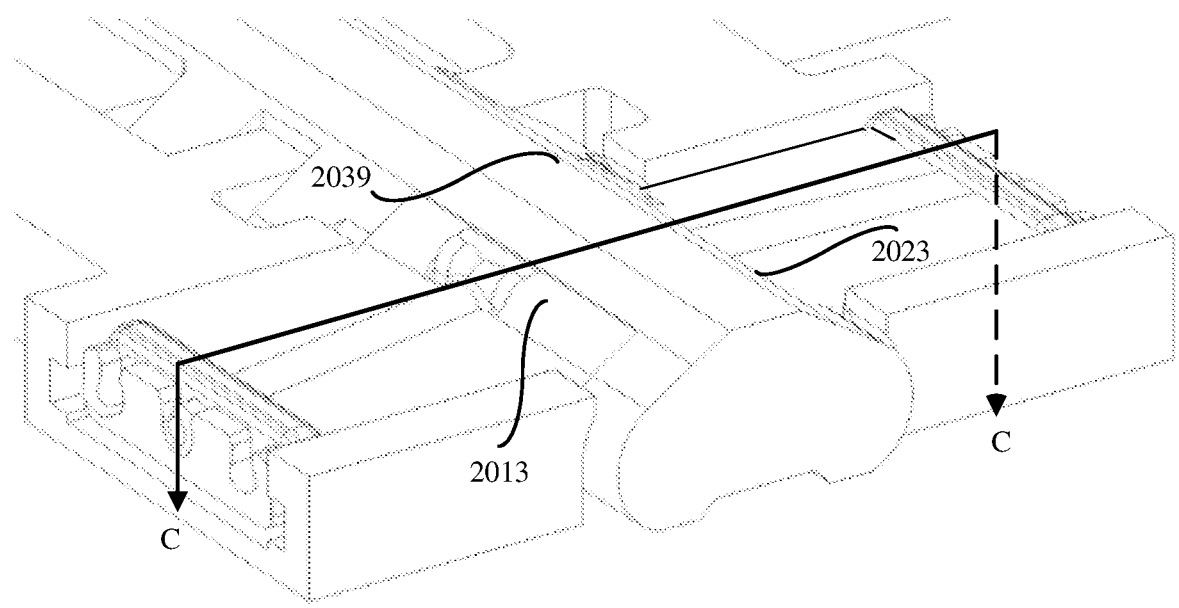
FIG. 20a is a schematic diagram of another structure of the rotating mechanism in FIG. 20.

Therefore, in an implementation of this application, as shown in FIG. 20 and FIG. 20a, a first opening 2013 and a second opening 2023 are disposed on the outer guide shaft 2039. A first end of the third mechanical part 204 is connected to the first rotating shaft 2031, and a second end of the third mechanical part 204 extends into a first slide groove 2011 after passing through the first opening 2013. In addition, a first support portion 2044 is disposed at an end position of the second end, and the first support portion 2044 is further provided with a first guide rod 2045. An axis of the first guide rod 2045 is perpendicular to an axial direction of the third mechanical part 204. A first guide rail 2014 matching the first guide rod 2045 is disposed on either side of the first slide groove 2011. When the first mechanical part 201 rotates, the first guide rod 2045 may slide along the first guide rail 2014.

Similarly, a first end of the fourth mechanical part 214 is connected to the second rotating shaft 2032, and a second end of the fourth mechanical part 214 extends into a second slide groove 2021 after passing through the second opening 2023. In addition, a second support portion 2144 is disposed at an end position of the second end, and the second support portion 2144 is provided with a second guide rod 2145. An axis of the second guide rod 2145 is perpendicular to an axial direction of the fourth mechanical part 214. A second guide rail 2024 matching the second guide rod 2145 is disposed on either side of the second slide groove 2021. When the second mechanical part 202 rotates, the second guide rod 2145 may slide along the second guide rail 2024.

In this way, the third mechanical part 201 is slidably connected to the first slide groove 2011, and the fourth mechanical part 214 is slidably connected to the second slide groove, thereby reducing pulling force on the flexible screen during rotation of the first mechanical part and the second mechanical part, and improving flatness of the flexible screen.

However, it can be understood that, when the first mechanical part 201 and the second mechanical part 202 rotate out of synchronization, for example, when the first mechanical part 201 rotates and the second mechanical part 202 does not rotate, the first mechanical part 201 and the second mechanical part 202 generate different pulling force on the flexible screen. This easily causes deviation of the flexible screen toward one side, affecting stability of connection between the flexible screen and the rotating mechanism.

Figure 21:
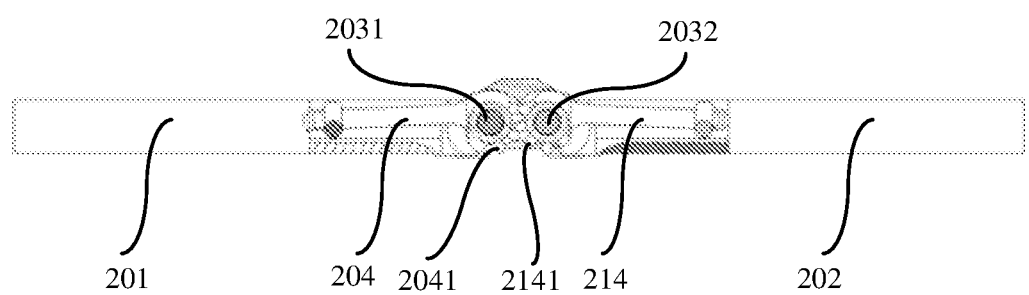

As shown in FIG. 20, FIG. 20a, and FIG. 21, the rotating mechanism further includes a first gear 2041 and a second gear 2141. The first gear 2041 is sleeved on the first rotating shaft 2031, and the first gear 2041 is rotatably connected to the first rotating shaft 2031. One end, close to the first rotating shaft 2031, of the third mechanical part 204 is connected to the first gear 2041.

Similarly, the second gear 2141 is sleeved on the second rotating shaft 2032, and the second gear 2141 is rotatably connected to the second rotating shaft 2032. One end, close to the second rotating shaft 2032, of the fourth mechanical part 214 is connected to the second gear 2141.

The first gear 2041 and the second gear 2141 are disposed in parallel between the first rotating shaft 2031 and the second rotating shaft 2032, and the first gear 2041 meshes with the second gear 2141 mesh. Therefore, when the first gear 2041 rotates, the second gear 2141 can be driven to rotate synchronously, or when the second gear 2141 rotates, the first gear 2041 can be driven to rotate synchronously.

A working process of the rotating mechanism is described below by using the first mechanical part as an example. When the first mechanical part 201 rotates, the third mechanical part 204 and the first gear 2041 rotate accordingly around the first rotating shaft 2031. In addition, under meshing action of the gears, motion and impetus of the first gear 2041 can be transferred to the second gear 2141. Therefore, the second gear 2141 obtains a rotational speed and a torque, to further drive the fourth mechanical part 214 to rotate with rotation of the second gear 2141, and drive the second mechanical part 202 to rotate. In this way, synchronous motion of the first mechanical part 201 and the second mechanical part 202 is achieved, and stability of connection between the flexible screen and the rotating mechanism is improved.

It can be understood that the third mechanical part 204 acts on the first mechanical part 201, and the fourth mechanical part 214 acts on the second mechanical part 202. During rotation, the meshing action of the gears can transmit a torque in unfolding and folding processes of the rotating mechanism.

According to the rotating mechanism provided in this embodiment of this application, a torque may be transferred for unfolding and folding of the rotating mechanism by using the meshing action of the gears. This achieves synchronous motion of the first mechanical part and the second mechanical part, and further achieves synchronization of the flexible screen on both sides of the rotating shaft.

In addition, because the rotating members are directly connected to the gears, a length of an arm of force is approximately a radius of the rotating shaft plus a length of the rotating member. In the foregoing two embodiments, torques are respectively provided by using the C-shaped clasp and the cam, and a length of an arm of force thereof is approximately a radius of the rotating shaft. Compared with structures of the foregoing C-shaped clasp and cam, the arm of force is longer and the torque is larger in this embodiment, thereby better transmitting the torque for unfolding and folding of the rotating mechanism.

Figure 22:
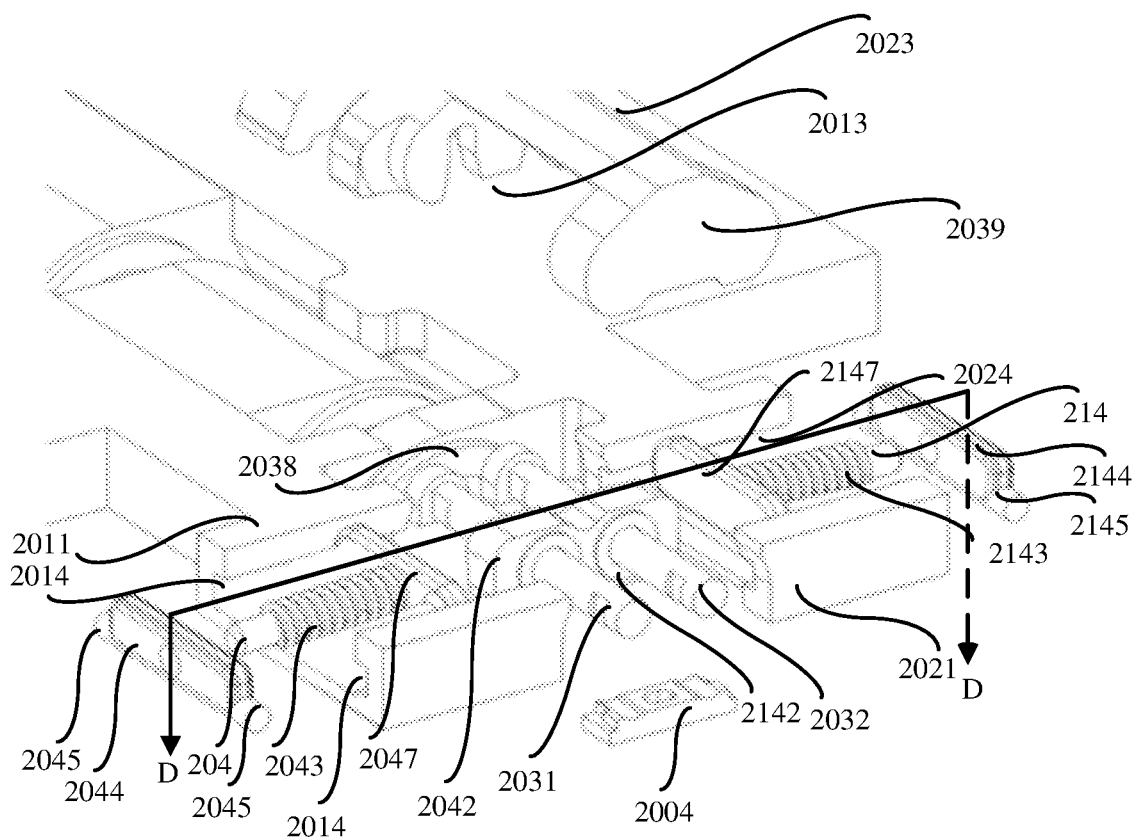
FIG. 22 is a schematic diagram of a structure of another rotating mechanism according to an embodiment of this application.
Figure 23:
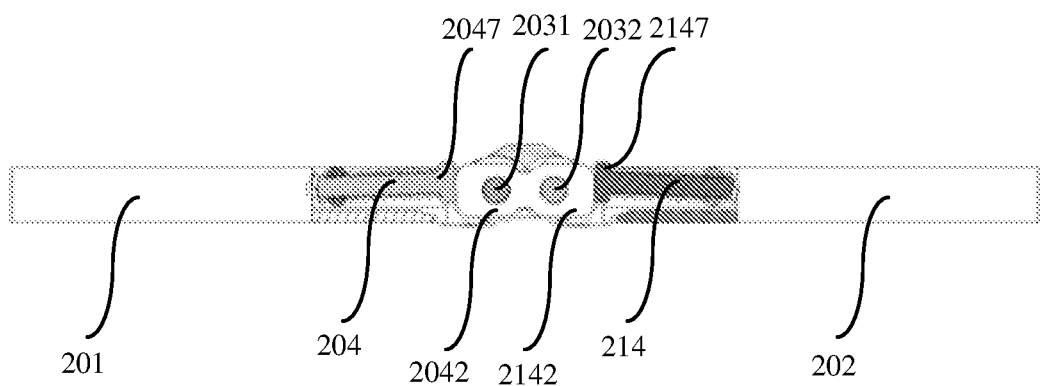
FIG. 23 is a sectional view D-D of the rotating mechanism of FIG. 22.
Figure 24:
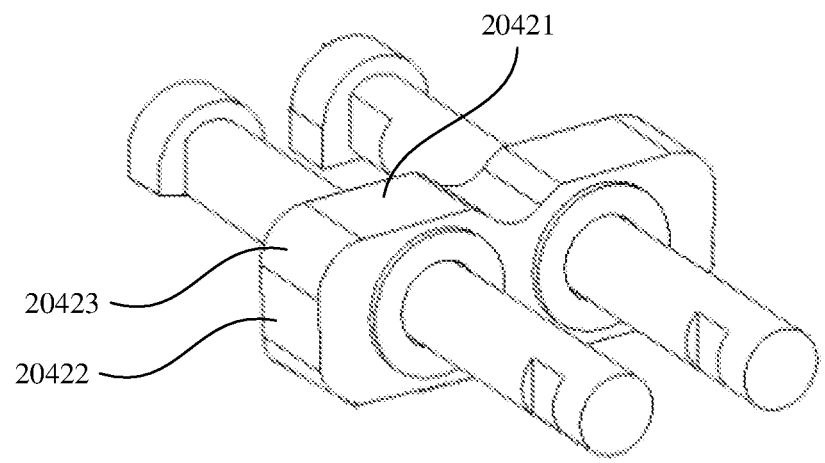
FIG. 24 is a schematic diagram of a structure of a cam in FIG. 23.

As shown in FIG. 22, FIG. 23, and FIG. 24, in another implementation of this application, the rotating mechanism includes at least a first mechanical part 201, a second mechanical part 202, a third mechanical part 204, a fourth mechanical part 214, and a rotating shaft 203. The rotating shaft 203 includes an inner guide shaft, an outer guide shaft, a first rotating shaft 2031, and a second rotating shaft 2032. For specific structures of the first mechanical part 201, the second mechanical part 202, the third mechanical part 204, the fourth mechanical part 214, the inner guide shaft 2038, the outer guide shaft 2039, the first rotating shaft 2031, and the second rotating shaft 2032, refer to the foregoing embodiments. Details are not described herein again.

The first rotating shaft 2031 is sleeved with a first cam 2042, and the second rotating shaft 2032 is sleeved with a second cam 2142. The first cam 2042 may be fixedly connected to the second cam 2142. When the first mechanical part 201 and the second mechanical part 202 rotate, the first rotating shaft 2031, the second rotating shaft 2032, the first cam 2042, and the second cam 2142 are stationary with respect to a rotation axis.

A first moving member 2047 that can move along the first cam 2042 is disposed at one end, close to the first rotating shaft 2031, of the third mechanical part 204. The first moving member 2047 and the third mechanical part 204 may be formed in integral molding.

Similarly, a second moving member 2147 that can move along the second cam 2142 is disposed at one end, close to the second rotating shaft 2032, of the fourth mechanical part 214. The second moving member 2147 and the fourth mechanical part 214 may be formed in integral molding.

In addition, the third mechanical part 204 is sequentially sleeved in a direction close to the first mechanical part 201 with a second elastic component 2043, a first support portion 2044, and a first limiting portion (which is not shown in FIG. 22, and reference may be made to 2046 in FIG. 26) for preventing the second elastic component 2043 and the first support portion 2044 from being disengaged. In addition, the first support portion 2044 is provided with a first guide rod 2045. An axis of the first guide rod 2045 is perpendicular to an axial direction of the third mechanical part 204. A first guide rail 2014 matching the first guide rod 2045 is disposed on either side of a slide groove of the first mechanical part 201. When the first mechanical part 201 rotates, the first guide rod 2045 may slide along the first guide rail 2014.

The first elastic component 204 may be a spring.

The following describes a working process of the rotating mechanism by using the first mechanical part 201 as an example. Radii at different positions of the first cam 2042 are different. Therefore, for example, as shown in FIG. 24, the first cam has a first surface 20421, a second surface 20422, and a third surface 20423. The first surface 20421 and the second surface 20422 are flat surfaces, and the third surface 20423 is an arc-shaped surface. Distances from the first surface 20421 and the second surface 20422 to an axis of the first rotating shaft 2031 are less than a radius of the third surface 20423. An included angle between the first surface 20421 and the second surface 20422 may be 90°.

When the first mechanical part 201 rotates, the third mechanical part 204 drives the first moving member 2047 to move along a surface of the first cam 2042. When the third mechanical part 204 and the fourth mechanical part 214 are in a folded state, an included angle between the third mechanical part 204 and the fourth mechanical part 214 is 0°, and the first moving member 2047 is in contact with the first surface 20421. Deformation of the second elastic component 2043 is first deformation.

When the third mechanical part 204 and the fourth mechanical part 214 are in an unfolded state, an included angle between the third mechanical part 204 and the fourth mechanical part 214 is 180°, and the third mechanical part 204 is in contact with the second surface 20422. Deformation of the second elastic component 2043 is first deformation.

When the third mechanical part 204 and the fourth mechanical part 214 are in a state between a folded state and an unfolded state, an included angle between the third mechanical part 204 and the fourth mechanical part 214 is between 0° and 180°, and the third mechanical part 204 is in contact with the third surface 20423. Deformation of the second elastic component 2043 is second deformation. A deformation value of the second deformation is greater than a deformation value of the first deformation.

Therefore, when the second elastic component 2043 restores from the second deformation to the first deformation, the second elastic component springs back and releases energy, to provide a torque for the third mechanical part. Therefore, when the rotating mechanism is closing, closing force can be provided to make a folding process easier. In an initial phase from the folded state to a flattened state of the rotating mechanism, the second elastic component 2043 changes from the first deformation to the second deformation, to provide proper resistance for the third mechanical part to avoid too fast unfolding of the flexible screen. When the rotating mechanism is unfolded to a specific angle, the second elastic component 2043 changes from the second deformation back to the first deformation, to provide proper assistance for the third mechanical part to achieve automatic flattening. After the unfolding, the second elastic component 2043 is in the first deformation, to provide flattening holding force for the third mechanical part.

In this way, a fitting position of the first moving member 2047 and the first surface and the second surface of the first cam can be used as a flattened position or a folded position of the flexible screen, and holding force can be provided for folding or flattening of the flexible screen.

In another implementation of this application, the fourth mechanical part 214 is sequentially sleeved in a direction close to the second mechanical part 202 with a third elastic component 2143, a second support portion 2144, and a second limiting portion (which is not shown in FIG. 22, and reference may be made to 2146 in FIG. 26) for preventing the third elastic component 2143 and the second support portion 2144 from being disengaged. In addition, the second support portion 2144 is provided with a second guide rod 2145. An axis of the second guide rod 2145 is perpendicular to an axial direction of the fourth mechanical part 214. A second guide rail 2024 matching the second guide rod 2145 is disposed on either side of a slide groove of the second mechanical part 202. When the second mechanical part 202 rotates, the second guide rod 2145 slides along the second guide rail 2024.

The third elastic component 2143 may use a same structure as the second elastic component 2043, and details are not described herein again. For a working process of the second mechanical part 202, refer to the description of the first mechanical part 201. Details are not described herein again.

It can be understood that the third mechanical part 204 acts on the first mechanical part 201, and the fourth mechanical part 214 acts on the second mechanical part 202. During rotation, a torque can be provided for unfolding and folding of the rotating mechanism.

In this way, through fitting between a spring and a cam, a torque can be provided for rotation of the first rotating shaft and the second rotating shaft. The first rotating shaft can transmit the torque to the first mechanical part through the third mechanical part, and the second rotating shaft can transmit the torque to the second mechanical part through the fourth mechanical part, so as to finally act on the flexible screen, and provide holding force for folding or flattening of the flexible screen.

A type and a quantity of structures that provide the torque are not limited in this embodiment of this application. Each rotating mechanism may be provided with one or more sets of structures for providing the torque, to provide a robust torque for unfolding and folding of the rotating mechanism.

Figure 25:
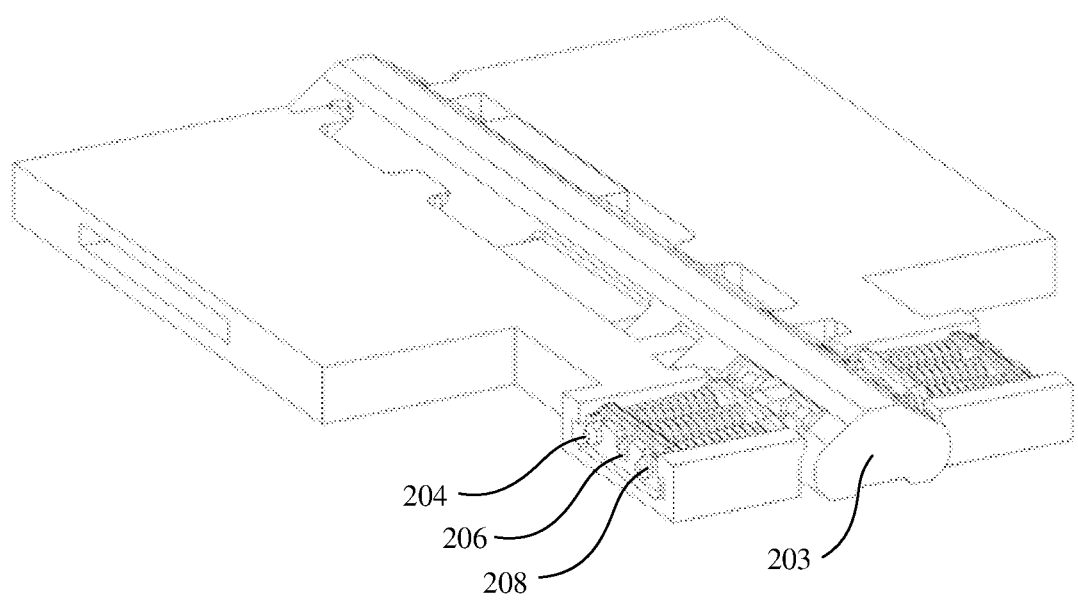
FIG. 25 is a schematic diagram of a structure of another rotating mechanism according to an embodiment of this application.
Figure 26:
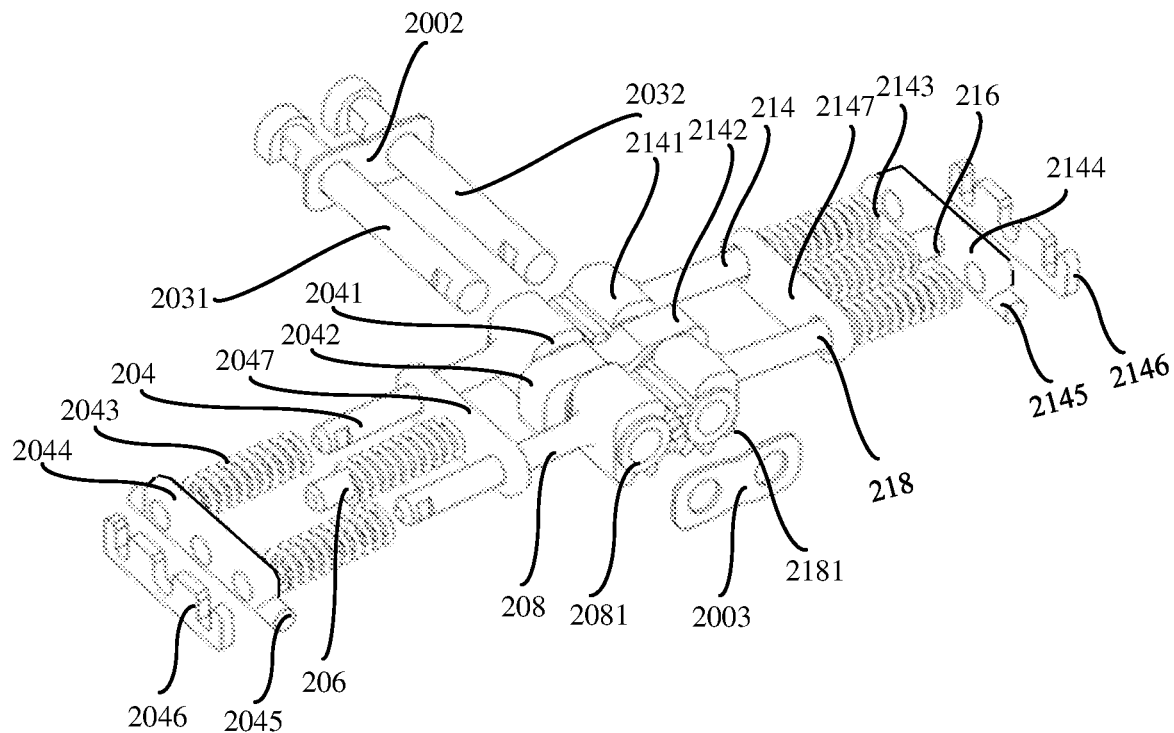
FIG. 26 is a schematic diagram a partial structure of the rotating mechanism in FIG. 25.
Figure 27:
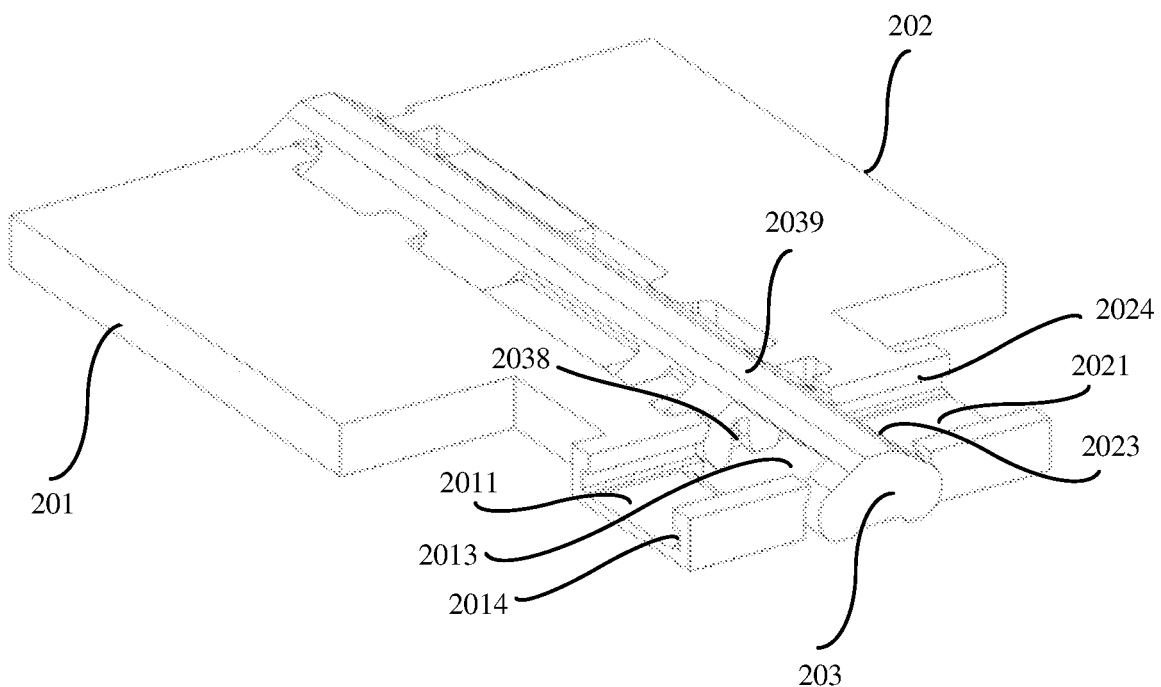
FIG. 27 is a schematic diagram of another partial structure of the rotating mechanism in FIG. 25.

In another implementation of this application, the rotating mechanism includes three sets of structures configured to provide a torque. As shown in FIG. 25, FIG. 26, and FIG. 27, the rotating mechanism includes a first mechanical part 201, a second mechanical part 202, a rotating shaft 203, a third mechanical part 204, a fourth mechanical part 214, a fifth mechanical part 206, a sixth mechanical part 216, a seventh mechanical part 208, and an eighth mechanical part 218.

The rotating shaft 203 includes an inner guide shaft, an outer guide shaft, a first rotating shaft 2031, and a second rotating shaft 2032. For specific structures of the first mechanical part 201, the second mechanical part 202, the third mechanical part 204, the fourth mechanical part 214, the inner guide shaft 2038, the outer guide shaft 2039, the first rotating shaft 2031, and the second rotating shaft 2032, refer to the foregoing embodiments. Details are not described herein again.

The third mechanical part 204, the fourth mechanical part 214, the fifth mechanical part 206, the sixth mechanical part 216, the seventh mechanical part 208, and the eighth mechanical part 218 may use, for example, a same structure.

The third mechanical part 204, the fifth mechanical part 206, and the seventh mechanical part 208 may be disposed in parallel in a first slide groove 2011.

Similarly, the fourth mechanical part 214, the sixth mechanical part 216, and the eighth mechanical part 218 may be disposed in parallel in a second slide groove 2021.

The first rotating shaft 2031 is sleeved with a first gear 2041, and the first gear 2041 is rotatably connected to the first rotating shaft 2031. One end, close to the first rotating shaft 2031, of the third mechanical part 204 is connected to the first gear 2041.

Similarly, the second rotating shaft 2032 is sleeved with a second gear 2141, and the second gear 2141 is rotatably connected to the second rotating shaft 2032. One end, close to the second rotating shaft 2032, of the fourth mechanical part 214 is connected to the second gear 2141. The first gear 2141 meshes with the second gear 2041.

The first rotating shaft 2031 is further sleeved with a first cam 2042. A first moving member 2047 that moves along the first cam 2042 is disposed at one end, close to the first rotating shaft 2031, of the fifth mechanical part 206. The first moving member 2047 and the fifth mechanical part 206 may be formed in integral molding. The first moving member 2047 is sleeved, for example, on both the third mechanical part 204 and the seventh mechanical part 208, so that the third mechanical part 204, the fifth mechanical part 206, and the seventh mechanical part 208 can rotate synchronously.

The second rotating shaft 2032 is further sleeved with a second cam 2142. The first cam 2042 is fixedly connected to the second cam 2142. A second moving member 2147 that moves along the second cam 2142 is disposed at one end, close to the second rotating shaft 2032, of the sixth mechanical part 216. The second moving member 2147 and the fourth mechanical part 216 may be formed in integral molding. The second moving member 2147 is sleeved, for example, on both the fourth mechanical part 214 and the eighth mechanical part 218, so that the fourth mechanical part 214, the sixth mechanical part 216, and the eighth mechanical part 218 can rotate synchronously.

The first rotating shaft 2031 is sleeved with a third gear 2081, and the third gear 2081 is rotatably connected to the first rotating shaft 2031. One end, close to the first rotating shaft 2031, of the seventh mechanical part 208 is connected to the third gear 2081.

Similarly, the second rotating shaft 2032 is sleeved with a fourth gear 2181, and the fourth gear 2181 is rotatably connected to the second rotating shaft 2032. One end, close to the second rotating shaft 2032, of the eighth mechanical part 218 is connected to the fourth gear 2181. The fourth gear 2181 meshes with the third gear 2081.

A first gasket 2002 and a second gasket 2003 that are configured to control an axial distance between the first rotating shaft 2031 and the second rotating shaft 2032 are further disposed at both ends of the first rotating shaft 2031 and the second rotating shaft 2032.

The third mechanical part 204, the fifth mechanical part 206, and the seventh mechanical part 208 are sequentially sleeved with second elastic components 2043, a first support member 2044 capable of simultaneously sliding along the third mechanical part 204, the fifth mechanical part 206, and the seventh mechanical part 208, and a first limiting part 2046 for preventing the second elastic component 2043 and the first support member 2044 from being disengaged. In addition, the first support member 2044 is provided with a first guide rod 2045. A first guide rail 2014 matching the first guide rod 2045 is disposed in a slide groove of the first mechanical part 201. When the first mechanical part 201 rotates, the first guide rod 2045 slides along the first guide rail 2014.

In another implementation of this application, the fourth mechanical part 214, the sixth mechanical part 216, and the eighth mechanical part 218 are sequentially sleeved with a third elastic component 2143, a second support member 2144 capable of simultaneously sliding along the fourth mechanical part 214, the sixth mechanical part 216, and the eighth mechanical part 218, and a second limiting portion 2146 for preventing the third elastic component 2143 and the second support member 2144 from being disengaged. In addition, the second support member 2144 is provided with a second guide rod 2145. A second guide rail 2024 matching the second guide rod 2145 is disposed in a slide groove of the second mechanical part 202. When the second mechanical part 202 rotates, the second guide rod 2145 slides along the first guide rail 2024.

The following describes a working process of the rotating mechanism by using the first mechanical part 201 as an example. When the first mechanical part 201 rotates, the third mechanical part 204 and the first gear 2041 rotate accordingly around the first rotating shaft 2031. Under meshing action of the gears, motion and impetus of the first gear 2041 can be transferred to the second gear 2141. Therefore, the second gear 2141 obtains a rotational speed and a torque, to further drive the fourth mechanical part 214 to rotate. The seventh mechanical part 208 drives the third gear 2081 to rotate around the first rotating shaft 2031. Under meshing action of the gears, motion and impetus of the third gear 2081 are transmitted to the fourth gear 2181. Therefore, the fourth gear 2181 obtains a rotational speed and a torque, to drive the eighth mechanical part 218 to rotate, and further drive the second mechanical part 202 to rotate. In this way, synchronous motion of the first mechanical part 201 and the second mechanical part 202 is achieved. In addition, during rotation, the meshing action of the gears can transmit a torque during unfolding and folding of the rotating mechanism.

In addition, when the first mechanical part 201 rotates, the sixth mechanical part 216 drives the first moving member 2047 to move along the first cam 2042. When the first moving member 2047 moves to a first surface or a second surface of the first cam, deformation of the second elastic component 2043 is first deformation. When the first moving member 2047 moves to a third surface of the first cam, deformation of the second elastic component 2043 is second deformation. A deformation value of the second deformation is greater than a deformation value of the first deformation. When the second elastic component 2043 restores from the second deformation to the first deformation, the second elastic component 2043 can spring back and release energy, to provide a torque for the rotating mechanism.

For a working process of the second mechanical part 202, refer to the description of the first mechanical part 201. Details are not described herein again.

According to the rotating mechanism provided in this embodiment of this application, synchronous rotation of rotating members on both sides of the rotating shaft can be achieved by using the meshing action of the gears. This prevents deviation of a flexible screen caused by rotation of only one rotating member, thereby improving stability of connection between the flexible screen and the rotating mechanism. In addition, under the meshing action of the gears and joint action of the cam and a spring, closing force can be provided when the rotating mechanism is closing to make a folding process easier. In an initial phase from the folded state to a flattened state of the rotating mechanism, proper resistance is provided to avoid too fast unfolding of the flexible screen. When the rotating mechanism is unfolded to a specific angle, proper assistance is provided to achieve automatic flattening, and after the rotating mechanism is unfolded, flattening holding force is provided.

Moreover, the rotating member is arranged perpendicular to an axis of the rotating shaft, an arm of force is longer, and a torque is larger, to provide a robust torque for unfolding and folding of the rotating mechanism. In addition, a plurality of rotating members share one rotating shaft, and coupled mechanical parts occupy very small space, which facilitates miniaturization of the rotating mechanism.

The foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A rotating mechanism, comprising:
    a rotating shaft;
    a first mechanical part, wherein a first slide groove extends in the first mechanical part;
    a second mechanical part, wherein a second slide groove extends in the second mechanical part;
    a third mechanical part, wherein a first end of the third mechanical part is connected to the rotating shaft, and a second end of the third mechanical part is disposed in the first slide groove;
    a fourth mechanical part, wherein a first end of the fourth mechanical part is connected to the rotating shaft, and a second end of the fourth mechanical part is disposed in the second slide groove; and
    an elastic component, wherein the elastic component is sleeved on the rotating shaft, or is clasped on the rotating shaft, or is sleeved on the third mechanical part or the fourth mechanical part;
    wherein the first mechanical part, the second mechanical part, the third mechanical part, and the fourth mechanical part are configured in a manner that, when the first mechanical part and the second mechanical part rotate around the rotating shaft, the second end of the third mechanical part slides with respect to the first slide groove, and the second end of the fourth mechanical part slides with respect to the second slide groove; and
    wherein the elastic component is sleeved on the rotating shaft, or is clasped on the rotating shaft, and the elastic component is configured in a manner that:
        when the first mechanical part and the second mechanical part are in a folded state or an unfolded state, deformation of the elastic component is a first deformation; or
        when the first mechanical part and the second mechanical part are in a state between folded and unfolded states, deformation of the elastic component is a second deformation; or
    wherein the elastic component is sleeved on the third mechanical part or the fourth mechanical part, and the elastic component is configured in a manner that:
        when the third mechanical part has a first positional relationship with a cam, deformation of the elastic component is the first deformation; or
        when the third mechanical part has a second positional relationship with a cam, deformation of the elastic component is the second deformation; and
    wherein a deformation value of the second deformation is greater than a deformation value of the first deformation.

2. The rotating mechanism according to claim 1, wherein:
    the rotating shaft comprises a first rotating shaft and a second rotating shaft;
    the first rotating shaft and the second rotating shaft are connected through a transmission structure;
    the third mechanical part is connected to a first end of the transmission structure;
    the fourth mechanical part is connected to a second end of the transmission structure; and
    wherein the rotating mechanism is configured in a manner that:
        when the third mechanical part drives the first end of the transmission structure to rotate around the first rotating shaft, the second end of the transmission structure drives the fourth mechanical part to rotate around the second rotating shaft; or
        when the fourth mechanical part drives the second end of the transmission structure to rotate around the second rotating shaft, the first end of the transmission structure drives the third mechanical part to rotate around the first rotating shaft.

3. The rotating mechanism according to claim 2, wherein the transmission structure comprises a first gear sleeved on the first rotating shaft and a second gear sleeved on the second rotating shaft, and the first gear meshes with the second gear.

4. The rotating mechanism according to a claim 2, wherein the rotating shaft further comprises an inner guide shaft and an outer guide shaft, and the inner guide shaft is covered by the outer guide shaft; and
   wherein a length of the inner guide shaft is less than a length of the outer guide shaft, a first end in a length direction of the outer guide shaft extends in the length direction with respect to a first end in a length direction of the inner guide shaft, and the first rotating shaft and the second rotating shaft are disposed between the first end in the length direction of the inner guide shaft and the first end in the length direction of the outer guide shaft.

5. The rotating mechanism according to claim 4, wherein an outer surface of the inner guide shaft and an inner surface of the outer guide shaft enclose a slide rail;
   wherein the first mechanical part comprises a first rotating member, the second mechanical part comprises a second rotating member, and both the first rotating member and the second rotating member are located in the slide rail; and
   wherein the rotating mechanism is further configured in a manner that:
      when the first mechanical part and the second mechanical part rotate around the rotating shaft, the first rotating member and the second rotating member rotate in the slide rail and around the inner guide shaft.

6. The rotating mechanism according to claim 1, wherein the rotating shaft comprises a first rotating shaft and a second rotating shaft, and the first rotating shaft is connected to the second rotating shaft;
   wherein the elastic component comprises a first elastic component disposed on the third mechanical part;
   wherein the first rotating shaft is sleeved with a first cam;
   wherein the third mechanical part is in contact with a surface of the first cam;
   wherein the rotating mechanism is configured in a manner that, when the first mechanical part rotates, the first cam is stationary with respect to the first rotating shaft, and the third mechanical part rotates along the surface of the first cam and around the first rotating shaft;
   wherein the first cam has a first surface, a second surface, and a third surface; and
   wherein the rotating mechanism is configured in manner that:
      when the third mechanical part is in contact with the first surface or the second surface, deformation of the first elastic component is the first deformation; or
      when the third mechanical part is in contact with the third surface, deformation of the first elastic component is the second deformation.

7. The rotating mechanism according to claim 1, wherein the elastic component is a spring or a spring washer.

8. The rotating mechanism according to claim 1, wherein the rotating shaft comprises a first rotating shaft and a second rotating shaft, and the first rotating shaft is connected to the second rotating shaft;
   wherein the elastic component comprises a first C-shaped clasp sleeved on the first rotating shaft;
   wherein the rotating mechanism is configured in a manner that, when the first mechanical part rotates, the first rotating shaft rotates with respect to the first C-shaped clasp;
   wherein an inner side of the first C-shaped clasp has a first flat surface and a first curved surface, and the first rotating shaft comprises a third flat surface and a fifth flat surface matching the first flat surface, and a second curved surface matching the first curved surface; and
   wherein the rotating mechanism is further configured in a manner that:
      when the third flat surface or the fifth flat surface is in contact with the first flat surface, the second curved surface is in contact with the first curved surface, and deformation of the first C-shaped clasp is the first deformation; or
      when the second curved surface is in contact with the first flat surface, deformation of the first C-shaped clasp is the second deformation.

9. The rotating mechanism according to claim 1, wherein the rotating shaft comprises a third rotating shaft, and the elastic component comprises a second elastic component sleeved on the third rotating shaft;
   wherein the third rotating shaft is further sleeved with the cam and a concave wheel;
   wherein the rotating mechanism is configured in a manner that, when the first mechanical part rotates, the third mechanical part and the concave wheel rotate with respect to the third rotating shaft, and the cam slides with respect to the third rotating shaft;
   wherein the cam comprises a convex portion, and the concave wheel comprises a flat portion and a concave portion matching the convex portion; and
   wherein the rotating mechanism is configured in a manner that:
      when the convex portion of the cam matches the concave portion, deformation of the second elastic component is the first deformation; or
      when the convex portion of the cam is in contact with the flat portion, deformation of the second elastic component is the second deformation.

10. The rotating mechanism according to claim 9, wherein the second elastic component is a belleville washer or a spring washer.

11. The rotating mechanism according to claim 1, wherein the rotating shaft comprises a first rotating shaft and a second rotating shaft;
   wherein the first rotating shaft and the second rotating shaft are connected through a transmission structure;
   wherein the third mechanical part is connected to a first end of the transmission structure;
   wherein the fourth mechanical part is connected to a second end of the transmission structure;
   wherein the rotating mechanism is configured in a manner that:
      when the third mechanical part drives the first end of the transmission structure to rotate around the first rotating shaft, the second end of the transmission structure drives the fourth mechanical part to rotate around the second rotating shaft; or
      when the fourth mechanical part drives the second end of the transmission structure to rotate around the second rotating shaft, the first end of the transmission structure drives the third mechanical part to rotate around the first rotating shaft; and
   wherein the rotating mechanism is further configured in a manner that:
      when the third mechanical part and the fourth mechanical part are in a folded state or an unfolded state, deformation of the elastic component is the first deformation; or when the third mechanical part and the fourth mechanical part are in a state between folded and unfolded states, deformation of the elastic component is the second deformation.

12. The rotating mechanism according to claim 11, wherein the rotating mechanism further comprises a fifth mechanical part;
wherein the fifth mechanical part is disposed in the first slide groove;
wherein the transmission structure comprises a first gear sleeved on the first rotating shaft and a second gear sleeved on the second rotating shaft;
wherein the first gear meshes with the second gear;
wherein the elastic component comprises a first elastic component sleeved on the fifth mechanical part;
wherein the first rotating shaft is sleeved with a first cam;
wherein the fifth mechanical part is in contact with a surface of the first cam; and
wherein the rotating mechanism is configured in a manner that, when the first mechanical part rotates, the first cam is stationary with respect to the first rotating shaft, and the fifth mechanical part rotates along the surface of the first cam and around the first rotating shaft.

13. The rotating mechanism according to claim 1, wherein the first mechanical part comprises a first blade and a third blade, a first groove extends in the first blade, and the third blade comprises a first slider matching the first groove;
wherein the second mechanical part comprises a second blade and a fourth blade, a second groove extends in the second blade, and the fourth blade comprises a second slider matching the second groove; and
wherein the rotating mechanism is configured in a manner that, when the first mechanical part and the second mechanical part rotate around the rotating shaft, the first slider slides in the first groove, and the second slider slides in the second groove.

14. The rotating mechanism according to claim 1, wherein the third mechanical part comprises a first guide rod, and a first guide rail matching the first guide rod is disposed in the first slide groove;
wherein the fourth mechanical part is sleeved with a second support portion, the second support portion comprises a second guide rod, and a second guide rail matching the second guide rod is disposed in the second slide groove; and
wherein the rotating mechanism is configured in a manner that, when the first mechanical part and the second mechanical part rotate, the first guide rod slides along the first guide rail, and the second guide rod slides along the second guide rail.

15. A foldable display terminal, comprising:
a flexible screen; and
a rotating mechanism, comprising:
a rotating shaft;
a first mechanical part, wherein a first slide groove extends in the first mechanical part;
a second mechanical part, wherein a second slide groove extends in the second mechanical part;
a third mechanical part, wherein a first end of the third mechanical part is connected to the rotating shaft, and a second end of the third mechanical part is disposed in the first slide groove; and
a fourth mechanical part, wherein a first end of the fourth mechanical part is connected to the rotating shaft, and a second end of the fourth mechanical part is disposed in the second slide groove; and
an elastic component, wherein the elastic component is sleeved on the rotating shaft, or is clasped on the rotating shaft, or is sleeved on the third mechanical part or the fourth mechanical part; and
wherein the first mechanical part, the second mechanical part, the third mechanical part, and the fourth mechanical part are configured in a manner that, when the first mechanical part and the second mechanical part rotate around the rotating shaft, the second end of the third mechanical part slides with respect to the first slide groove, and the second end of the fourth mechanical part slides with respect to the second slide groove;
wherein the elastic component is sleeved on the rotating shaft, or is clasped on the rotating shaft, and is configured in a manner that:
when the first mechanical part and the second mechanical part are in a folded state or an unfolded state, deformation of the elastic component is first deformation; or
when the first mechanical part and the second mechanical part are in a state between folded and unfolded states, deformation of the elastic component is second deformation; or
wherein the elastic component is sleeved on the third mechanical part or the fourth mechanical part, and the elastic component is configured in a manner that:
when the third mechanical part has a first positional relationship with a cam, deformation of the elastic component is the first deformation; or
when the third mechanical part has a second positional relationship with a cam, deformation of the elastic component is the second deformation;
wherein a deformation value of the second deformation is greater than a deformation value of the first deformation; and
wherein a first region of the flexible screen is connected to the first mechanical part, a second region of the flexible screen is connected to the second mechanical part, a third region of the flexible screen is connected to the rotating shaft, and the third region is located between the first region and the second region.

16. The foldable display terminal according to claim 15, wherein the rotating shaft comprises a first rotating shaft and a second rotating shaft;
wherein the first rotating shaft and the second rotating shaft are connected through a transmission structure;
wherein the third mechanical part is connected to a first end of the transmission structure;
wherein the fourth mechanical part is connected to a second end of the transmission structure; and
wherein the rotating mechanism is configured in a manner that:
when the third mechanical part drives the first end of the transmission structure to rotate around the first rotating shaft, the second end of the transmission structure drives the fourth mechanical part to rotate around the second rotating shaft; or
when the fourth mechanical part drives the second end of the transmission structure to rotate around the second rotating shaft, the first end of the transmission structure drives the third mechanical part to rotate around the first rotating shaft.

17. The foldable display terminal according to claim 16, wherein the transmission structure comprises a first gear sleeved on the first rotating shaft and a second gear sleeved on the second rotating shaft, and the first gear meshes with the second gear.

18. The foldable display terminal according to claim 15, wherein the rotating shaft comprises a first rotating shaft and a second rotating shaft, and the first rotating shaft is connected to the second rotating shaft;
- wherein the elastic component comprises a first elastic component disposed on the third mechanical part;
- wherein the first rotating shaft is sleeved with a first cam;
- wherein the third mechanical part is in contact with a surface of the first cam;
- wherein the rotating mechanism is configured in a manner that, when the first mechanical part rotates, the first cam is stationary with respect to the first rotating shaft, and the third mechanical part rotates along the surface of the first cam and around the first rotating shaft;
- wherein the first cam has a first surface, a second surface, and a third surface; and
- wherein the rotating mechanism is further configured in a manner that:
  - when the third mechanical part is in contact with the first surface or the second surface, deformation of the first elastic component is the first deformation; or
  - when the third mechanical part is in contact with the third surface, deformation of the first elastic component is the second deformation.

19. The foldable display terminal according to claim 15, wherein the elastic component is a spring or a spring washer.

20. The foldable display terminal according to claim 15, wherein the rotating shaft comprises a first rotating shaft and a second rotating shaft, and the first rotating shaft is connected to the second rotating shaft;
- wherein the elastic component comprises a first C-shaped clasp sleeved on the first rotating shaft;
- wherein the rotating mechanism is configured in a manner that, when the first mechanical part rotates, the first rotating shaft rotates with respect to the first C-shaped clasp;
- wherein an inner side of the first C-shaped clasp has a first flat surface and a first curved surface, and the first rotating shaft comprises a third flat surface and a fifth flat surface matching the first flat surface, and a second curved surface matching the first curved surface; and
- wherein the rotating mechanism is further configured in a manner that:
  - when the third flat surface or the fifth flat surface is in contact with the first flat surface, the second curved surface is in contact with the first curved surface, and deformation of the first C-shaped clasp is the first deformation; or
  - when the second curved surface is in contact with the first flat surface, deformation of the first C-shaped clasp is the second deformation.

\* \* \* \* \*